(12) United States Patent
Kumar et al.

(10) Patent No.: US 10,370,499 B2
(45) Date of Patent: Aug. 6, 2019

(54) CURABLE ORGANOSILOXANE OLIGOMER COMPOSITIONS

(71) Applicant: 3M INNOVATIVE PROPERTIES COMPANY, St. Paul, MN (US)

(72) Inventors: Kanta Kumar, Woodbury, MN (US); James T. Wolter, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 295 days.

(21) Appl. No.: 15/108,827

(22) PCT Filed: Dec. 22, 2014

(86) PCT No.: PCT/US2014/071786
§ 371 (c)(1),
(2) Date: Jun. 29, 2016

(87) PCT Pub. No.: WO2015/102979
PCT Pub. Date: Jul. 9, 2015

(65) Prior Publication Data
US 2016/0319081 A1   Nov. 3, 2016

Related U.S. Application Data

(60) Provisional application No. 61/922,160, filed on Dec. 31, 2013, provisional application No. 62/073,106, filed on Oct. 31, 2014.

(51) Int. Cl.
| | |
|---|---|
| C08G 77/44 | (2006.01) |
| C08G 77/08 | (2006.01) |
| C08G 77/24 | (2006.01) |
| C08L 83/08 | (2006.01) |
| C09D 183/10 | (2006.01) |
| C08K 5/31 | (2006.01) |
| C08K 5/5399 | (2006.01) |
| C08L 83/00 | (2006.01) |
| C09J 7/40 | (2018.01) |

(52) U.S. Cl.
CPC ............ *C08G 77/44* (2013.01); *C08G 77/08* (2013.01); *C08G 77/24* (2013.01); *C08K 5/31* (2013.01); *C08K 5/5399* (2013.01); *C08L 83/00* (2013.01); *C08L 83/08* (2013.01); *C09D 183/10* (2013.01); *C09J 7/401* (2018.01); *C09J 2201/606* (2013.01); *C09J 2483/005* (2013.01)

(58) Field of Classification Search
CPC .................. C08G 77/12; C08G 77/16
See application file for complete search history.

(56) References Cited

U.S. PATENT DOCUMENTS

| | | | |
|---|---|---|---|
| 4,181,752 | A | 1/1980 | Martens |
| 4,406,739 | A | 9/1983 | Kankaanpaa |
| 4,831,070 | A | 5/1989 | McInally |
| 5,229,212 | A | 7/1993 | Reed |
| 6,013,682 | A | 6/2000 | Dalle |
| 8,614,281 | B2 | 12/2013 | Hansen |
| 9,006,357 | B2 | 4/2015 | Yang |
| 2008/0293865 | A1 | 11/2008 | Kameda et al. |
| 2011/0098420 | A1 | 4/2011 | Takizawa et al. |
| 2012/0172471 | A1 | 7/2012 | Maliverney |
| 2013/0101841 | A1 | 4/2013 | Yang |
| 2013/0253134 | A1 | 9/2013 | Maliverney |

FOREIGN PATENT DOCUMENTS

| | | | |
|---|---|---|---|
| EP | 0268982 | | 6/1988 |
| EP | 0459500 | | 12/1991 |
| EP | 0698633 | | 2/1996 |
| EP | 0 909 779 | | 4/1999 |
| WO | WO 2012/003153 | | 1/2012 |
| WO | 2013 106193 | * | 7/2013 |
| WO | WO 2013/101742 | | 7/2013 |
| WO | WO 2013-106193 | | 7/2013 |

OTHER PUBLICATIONS

International Search report for PCT International Application No. PCT/US2014/071786 dated Mar. 31, 2015, 4 pages.

* cited by examiner

*Primary Examiner* — Kuo Liang Peng
(74) *Attorney, Agent, or Firm* — James A. Baker

(57) ABSTRACT

A curable composition including (a) at least one organosiloxane compound, fluorinated organosiloxane compound, or combination thereof having reactive silane functionality including at least two hydroxysilyl moieties; (b) at least one organosiloxane oligomer, fluorinated organosiloxane oligomer, or combination thereof having reactive silane functionality including at least two hydrosilyl moieties; and (c) a catalyst composition including (1) at least one base selected from amidines, guanidines, phosphazenes, proazaphosphatranes, and combinations thereof, and (2) at least one Lewis acid. At least one of the components (a) and (b) has an average reactive silane functionality of at least three, and the composition is substantially free of organic solvent (s). An alkoxysilane compound may be optionally included in the curable composition. A process for coating the composition to prepare articles having the cross-linked composition on at least a portion of at least one major substrate surface is also disclosed.

17 Claims, No Drawings

CURABLE ORGANOSILOXANE OLIGOMER COMPOSITIONS

FIELD

This disclosure relates to curable compositions including reactive organosiloxane compounds, and, in other aspects, to coated articles prepared using processes for coating and curing the compositions.

BACKGROUND

Moisture-curable compositions cure in the presence of moisture to form cross-linked materials such as release coatings and surface treatments that are useful in many industries. For example, a polysiloxane or fluorinated polysiloxane is often selected to provide moisture-curable release coatings suitable for use with pressure-sensitive adhesives. The moisture for curing is typically obtained from the atmosphere or from a substrate to which the composition has been applied, although it can also be added to the composition (for example, to enable curing in depth or in confinement).

Moisture-curable compositions usually comprise siloxane polymers having groups (for example, alkoxysilyl or acyloxysilyl moieties) that can react in the presence of moisture to form cured (that is, cross-linked) materials. Moisture-curable compositions comprising alkoxysilyl or acyloxysilyl functionality typically cure in two reactions. In the first reaction, the alkoxysilyl or acyloxysilyl groups hydrolyze in the presence of moisture and a catalyst to form silanol compounds having hydroxysilyl groups. In the second reaction, the hydroxysilyl groups condense with other hydroxysilyl, alkoxysilyl, or acyloxysilyl groups in the presence of a catalyst to form —Si—O—Si— linkages. The two reactions occur essentially simultaneously upon generation of the silanol compound. Commonly used catalysts for the two reactions include Bronsted and Lewis acids. A single material can catalyze both reactions.

Advantageously, the hydrolysis and condensation reactions proceed quickly after the moisture-curable composition has been applied, for example, to a substrate. At the same time, however, the reactions must not occur prematurely, for example, during processing or storage.

A good balance between these properties is often difficult to obtain, as rapid reactivity and storage stability are opposite properties to each other. For example, highly active catalysts such as tetraalkyl titanate esters rapidly accelerate the moisture-curing reaction but, at the same time, can make it difficult to process the materials without risking premature gelation in feed tanks, coating equipment, and other manufacturing and handling apparatus. Control of the amount of moisture can be critical, with too little moisture potentially resulting in slow or incomplete cure and too much moisture resulting in premature cure.

A variety of approaches have been used for providing moisture-curable compositions that have acceptable cure rates without processing and storage difficulties. For example, two-part systems have been developed (one part comprising a functional siloxane polymer and the other part comprising a catalyst), with the two parts being mixed immediately prior to use. While this approach has been useful in small-scale applications, it has been less efficient for large-scale manufacturing, where delays caused by having to mix the two parts have been undesirable. Furthermore, coating operations must be completed expeditiously before the composition cures in the pot, and this has been difficult when working with large surface area substrates or a large volume of composition.

Ammonium salt catalysts have been developed that are inactive until heated sufficiently to liberate an acid compound that initiates the moisture curing reaction. Liberation of the acid also generates an amine, however, that must be removed by evaporation. In addition, the heat used to activate the catalyst can damage heat-sensitive substrates onto which the composition has been applied.

Other materials (for example, onium salts such as sulfonium and iodonium salts) have been used to generate acid species in situ upon irradiation (for example, irradiation with ultraviolet light). Such materials have not required heat activation and therefore have enabled the use of heat-sensitive substrates without damage (and without the production of undesirable species requiring removal), but the materials have been relatively expensive, have exhibited cure inhibition on some substrates, and have required moisture control and the use of coating equipment with irradiation capability.

Conventional tin catalysts such as dibutyl tin dilaurate can provide stable curable compositions that can be processed and coated without premature gelation. In addition to typical moisture-curable systems, it has been found that curable compositions comprising dual reactive silane functionality in the form of hydrosilyl and hydroxysilyl groups (dehydrogenatively-curable systems) can be cured by using tin catalysts. The compositions have been widely used for pressure-sensitive adhesive and mold release applications but have sometimes suffered from relatively short pot lives. In addition, the use of tin catalysts is becoming particularly problematic because the organotin compounds generally employed as catalysts are now considered to be toxicologically objectionable.

Acceleration of cure has been achieved by the use of compounds such as diorganosulfoxides, imidazoles, and amines (including amidines and substituted guanidines) in combination with tin catalysts (and, in some cases, amine compounds alone) in various silicone compositions (including room temperature vulcanizing silicone compositions and dehydrogenatively-cured silicone compositions). Amine compounds including amidines have also been proposed for use in the absence of tin catalysts for curing moisture-curable, silyl-functional organic polymers, but practical curability of alkoxysilyl-functional organic polymers and acceptable adhesion to substrates were achieved only with strongly basic amines (those exhibiting a pH of at least 13.4 in aqueous solution).

Complexes of at least one Lewis acid and at least one nitrogen-containing, organic base have been used as catalysts in various types of reactions including hydrogenation of double bonds, reaction of compounds with isocyanate and hydroxyl functional groups to form urethane and/or polyurethane, atom transfer radical polymerization of (meth)acrylates and styrene, curing of biphenyl epoxy-phenol resin systems and other thermosettable compositions, decarboxylation of carboxylic acids, and synthesis of N-alkyl carbamates. The use of such complexes in the condensation curing (including dehydrogenative or dehydrocondensation curing) of solvent-based polysiloxane compositions has been disclosed in WO 2013/106193.

SUMMARY

Recognizing that there exists an ongoing need for curable, solvent-free organosiloxane compositions that nevertheless exhibit a low viscosity for a time sufficient to permit the compositions to be coated onto substrates using conventional methods, while also providing acceptable cure rates and pot life without significant processing and storage difficulties (for example, due to premature gelation), we have developed curable coating compositions including reactive organosiloxane oligomers, that are substantially free of organic solvents.

Advantageously, these solvent-free coating compositions are, in exemplary embodiments, efficiently processable (for example, without the need for mixing of a two-part system prior to cure), employ catalysts that do not generate species requiring removal, and/or do not require high-temperature activation (so as to enable curing at relatively low temperatures and/or the use of heat-sensitive substrates) or heating to remove organic solvents to effect curing. In certain exemplary embodiments, the compositions employ catalysts that are relatively non-toxic, are relatively stable in solution but relatively fast-curing upon drying, are effective in relatively low concentrations, and/or are effective under relatively low (or no) moisture conditions.

Thus, in one aspect, this disclosure describes curable compositions including dual reactive silane functionality. The compositions include: (a) at least one organosiloxane compound, fluorinated organosiloxane compound, or combination thereof having reactive silane functionality including at least two hydroxysilyl moieties (that is, monovalent moieties comprising a hydroxyl group bonded directly to a silicon atom); (b) at least one organosiloxane oligomer, fluorinated organosiloxane oligomer, or combination thereof having reactive silane functionality including at least two hydrosilyl moieties (that is, monovalent moieties comprising a hydrogen atom bonded directly to a silicon atom); and (c) a catalyst composition including: (1) at least one base selected from amidines, guanidines, phosphazenes, proazaphosphatranes, and combinations thereof, and (2) at least one Lewis acid.

At least one of components (a) and (b) has an average reactive silane functionality of at least three (that is, component (a) has at least three hydroxysilyl moieties (on average), component (b) has at least three hydrosilyl moieties (on average), or both). The composition is substantially free of an organic solvent.

In some exemplary embodiments, components (a) and (b) advantageously each include an organosiloxane oligomer having a weight average molecular weight no greater than 5,000 Da. Advantageously, each organosiloxane oligomer is a dimethylsiloxane oligomer. Advantageously, component (a) is hydroxyl-endblocked, so as to comprise two terminal hydroxysilyl moieties (on average). In certain exemplary presently preferred embodiments, the curable composition further comprises at least one alkoxysilane compound. The at least one alkoxysilane compound preferably includes 1-3 terminal alkoxy groups, which may be terminal to one or both ends of the alkoxysilane compound.

In certain exemplary embodiments, the base advantageously includes at least one amidine or guanidine (most advantageously, 1,8-diazabicyclo[5.4.0]-7-undecene (DBU)). Optionally, the curable compositions further include at least one carboxylic acid (e.g., acetic acid) or anhydride, and preferably additionally, a metal salt (e.g., Zinc(II) ethylhexanoate) having at least one metal cation that acts as a Lewis acid.

The curable compositions of the present disclosure can be cured to provide cross-linked networks having properties that can be tailored to the requirements of various different applications (for example, by varying the natures, relative amounts, and/or degrees of reactive silane functionality of starting components (a) and/or (b)). Thus, the curable compositions can be used to provide coatings having a variety of surface properties for use in numerous coating applications (for example, use as release coatings for pressure-sensitive adhesives, protective coatings, water- and/or oil-repellent coatings or surface treatments, and the like).

The curable compositions of the present disclosure can be particularly useful in relatively sensitive applications requiring careful and/or tailored control of surface properties (for example, release coating applications), as at least some embodiments of the curable compositions comprise catalyst compositions (for example, DBU and triethylborate) that do not appear to produce species that remain after curing, possibly because such species are sufficiently volatile to be evaporated from the composition during processing, thereby leaving essentially no catalyst contamination in the cured material (in contrast with the tin contamination of conventional tin catalysts, which can be particularly problematic in the area of electronics).

In view of the foregoing, at least some embodiments of the curable compositions of the present disclosure meet the above-described, ongoing need for solvent-free curable compositions that can provide acceptable cure rates without significant processing and storage difficulties (for example, being relatively stable in solution but relatively fast-curing upon drying), while also being efficiently processable using conventional coating methods (for example, without the need for mixing of a two-part system prior to cure, for removal of volatile organic solvents or other contaminants, and/or for high-temperature activation). At least some embodiments of the curable compositions also employ catalysts that are relatively non-toxic, while being effective in relatively low concentrations and/or under relatively low (or no) moisture conditions.

In another aspect, this disclosure describes a coating process including: (a) applying a curable composition according to any of the foregoing embodiments to at least a portion of a substrate; and (b) curing said composition to form a cross-linked coating on the substrate.

In yet another aspect, this disclosure describes an article including the cross-linked coating prepared by the foregoing process on at least a portion of at least one major surface of the substrate.

LISTING OF EXEMPLARY EMBODIMENTS

A. A composition comprising the following components:
  (a) at least one organosiloxane compound, fluorinated organosiloxane compound, or a combination thereof, comprising reactive silane functionality comprising at least two hydroxysilyl moieties;
  (b) at least one organosiloxane oligomer, fluorinated organosiloxane oligomer, or a combination thereof, comprising reactive silane functionality comprising at least two hydrosilyl moieties; and
  (c) a catalyst composition comprising (1) at least one base selected from amidines, guanidines, phosphazenes, proazaphosphatranes, and combinations thereof, and (2) at least one Lewis acid;
wherein at least one of components (a) and (b) has an average reactive silane functionality of at least three, and further wherein the composition is substantially free of an organic solvent.

B. The composition of embodiment A, wherein components (a) and (b) each comprise an organosiloxane oligomer having a weight average molecular weight no greater than 5,000 Da.

C. The composition of embodiment B, wherein each organosiloxane oligomer is a dimethylsiloxane oligomer.

D. The composition of any preceding embodiment, wherein component (a) is hydroxyl-endblocked.

E. The composition of any preceding embodiment, wherein component (a) is represented by the following general formula:

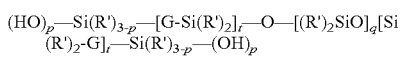

wherein each G is independently a divalent linking group; each R' is independently selected from alkyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl; each p is independently an integer of 1, 2, or 3; q is an integer of 0 to 150; and each t is independently an integer of 0 or 1.

F. The composition of embodiment E, wherein each G is independently selected from oxy, alkylene, arylene, heteroalkylene, heteroarylene, cycloalkylene, heterocycloalkylene, and combinations thereof; each R' is independently selected from alkyl, fluoroalkyl, aryl, and combinations thereof; q is an integer of 20 to 100; and/or t is an integer of 0.

G. The composition of embodiment F, wherein each R' is independently selected from methyl, phenyl, —C$_4$F$_9$C$_2$H$_4$, —C$_6$F$_{13}$C$_2$H$_4$, —CF$_3$C$_2$H$_4$, —C$_6$H$_5$C$_2$H$_4$.

H. The composition of any preceding embodiment, wherein component (a) comprises a mixture of (1) at least one polyorganosiloxane, fluorinated polyorganosiloxane, or combination thereof having a weight average molecular weight in the range of 10,000 to 1,000,000 and (2) at least one organosiloxane oligomer, fluorinated organosiloxane oligomer, or combination thereof having a weight average molecular weight in the range of about 150 to about 5,000 Da.

I. The composition of any preceding embodiment, wherein component (b) has an average reactive silane functionality of at least three.

J. The composition of any preceding embodiment, wherein component (b) is represented by the following general formula:

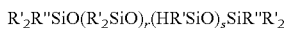

wherein each R' is independently selected from H, alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl; each R" is independently hydrogen or R'; r is an integer of 0 to 150; and s is an integer of 2 to 150.

K. The composition of embodiment J, wherein each R' is independently selected from alkyl, fluoroalkyl, aryl, and combinations thereof.

L. The composition of embodiment K, wherein each R' is independently selected from methyl, phenyl, —C$_4$F$_9$C$_2$H$_4$, —C$_6$F$_{13}$C$_2$H$_4$, —CF$_3$C$_2$H$_4$, and —C$_6$H$_5$C$_2$H$_4$.

M. The composition of embodiment J, wherein R' and R" are methyl; r is an integer of 0; and/or s is an integer of 40.

N. The composition of any preceding embodiment, wherein the base is selected from:
(1) amidine compounds that are represented by the following general formula:

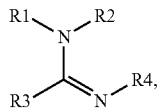

(2) guanidine compounds that are represented by the following general formula:

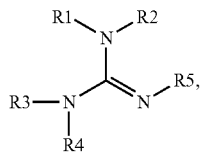

(3) phosphazene compounds that are represented by the following general formula:

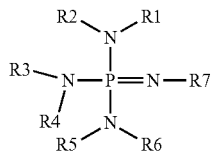

(4) proazaphosphatrane compounds that are represented by the following general formula:

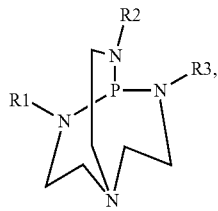

and combinations thereof;
wherein R1, R2, R3, R4, R5, R6, and R7 are each independently selected from hydrogen, monovalent organic groups, monovalent heteroorganic groups, and combinations thereof.

O. The composition of embodiment N, wherein the base is selected to include at least two amidine compounds, guanidine compounds, phosphazene compounds, and combinations thereof, and further wherein any two or more of R1, R2, R3, R4, R5, R6, and R7 of said at least two amidine, guanidine, and/or phosphazene compounds are bonded together to form at least one ring structure P. The composition of any preceding embodiment, wherein the base is selected from 1,2-dimethyl-1,4,5,6-tetrahydropyrimidine, 1,8-diazabicyclo[5.4.0]-7-undecene (DBU), 1,5-diazabicyclo[4.3.0]-5-nonene (DBN), 1,5,7-triazabicyclo[4.4.0]dec-5-ene (TBD), 7-methyl-1,5,7-triazabicyclo[4.4.0]dec-5-ene (MTBD), 2-tert-butyl-1,1,3,3-tetramethylguanidine, 2-tert-butylimino-2-diethylamino-1,3-dimethylperhydro-1,3,2-diazaphosphorine, phosphazene base P$_1$-t-Bu-tris(tetramethylene), phosphazene base P$_4$-t-Bu, 2,8,9-triisopropyl-2,5,8,9-tetraaza-1-phosphabicyclo[3.3.3]undecane, and combinations thereof.

Q. The composition of any preceding embodiment, wherein the base is selected from amidines, guanidines, and combinations thereof.

R. The composition of embodiment Q, wherein the base is selected from amidines and combinations thereof.

S. The composition of embodiment R, wherein the amidine is selected from 1,8-diazabicyclo[5.4.0]-7-undecene (DBU), 1,5-diazabicyclo[4.3.0]-5-nonene (DBN), and combinations thereof.

T. The composition of any preceding embodiment, wherein the Lewis acid is selected from metal salts, trialkylborates, triarylborates, and combinations thereof.

U. The composition of embodiment T, wherein the metal salts are metal salts of at least one organic acid.

V. The composition of embodiment U, wherein the metal salts of at least one organic acid are metal carboxylates.

W. The composition of embodiment V, wherein the metal carboxylates are metal alkanoates.

X. The composition of any one of embodiments T, U, V, or W, wherein the metal is selected from zinc, iron, copper, bismuth, aluminum, magnesium, and combinations thereof.

Y. The composition of any one of embodiments T, U, V, W, or X, wherein the metal is selected from zinc, bismuth, and combinations thereof.

Z. The composition of any preceding embodiment, wherein the Lewis acid is at least one metal salt.

AA. The composition of any preceding embodiment, wherein the Lewis acid is at least one trialkylborate.

BB. The composition of any preceding embodiment, wherein the Lewis acid is selected from the butryrate (butanoate), octanoate, neodecanoate, and ethylhexanoate salts of zinc, bismuth, aluminum, magnesium, and combinations thereof; trimethylborate; triethylborate; triisopropylborate; triphenylborate; tri(substituted phenyl)borates; and combinations thereof.

CC. The composition of any preceding embodiment, further comprising at least one carboxylic acid, at least one carboxylic acid anhydride, or a combination thereof.

DD. The composition of embodiment CC, wherein the at least one carboxylic acid and anhydride is selected from acetic acid, lactic acid, acetic anhydride, lactic anhydride, and combinations thereof.

EE. The composition of any preceding embodiment, wherein the composition is substantially free of a tin catalyst.

FF. The composition of any preceding embodiment, wherein the composition is in the form of a substantially homogeneous liquid mixture.

GG. The composition of any preceding embodiment, wherein components (a) and (b) have been chemically reacted with each other by cross-linking.

HH. A composition comprising:
(a) at least one organosiloxane oligomer, fluorinated organosiloxane oligomer, or combination thereof that is hydroxyl-endblocked;
(b) at least one organosiloxane oligomer, fluorinated organosiloxane oligomer, or combination thereof comprising at least three hydrosilyl moieties; and
(c) a catalyst composition comprising (1) at least one base selected from 1,2-dimethyl-1,4,5,6-tetrahydropyrimidine, 1,8-diazabicyclo[5.4.0]-7-undecene (DBU), 1,5-diazabicyclo[4.3.0]-5-nonene (DBN), 1,5,7-triazabicyclo[4.4.0]dec-5-ene (TBD), 7-methyl-1,5,7-triazabicyclo[4.4.0]dec-5-ene (MTBD), 2-tert-butyl-1,1,3,3-tetramethylguanidine, and combinations thereof, and (2) at least one Lewis acid selected from metal salts, trialkylborates, triarylborates, and combinations thereof, wherein the composition is substantially free of an organic solvent.

II. The composition of embodiment HH, wherein said components (a) and (b) each comprise an organosiloxane oligomer having a weight average molecular weight no greater than 5,000 Da.

JJ. The composition of embodiment HH or II, wherein each organosiloxane oligomer is a dimethylsiloxane oligomer.

KK. The composition of embodiment HH, wherein at least one of component (a) or component (b) is a fluorinated organosiloxane oligomer.

LL. The composition of any preceding embodiment, wherein the Lewis acid is a zinc(II) salt that is used in a 1:1 molar ratio with the base.

MM. The composition of any preceding embodiment, further comprising at least one alkoxysilane selected from:

(R"O)$_p$—Si(R')$_{3-p}$—[G-Si(R')$_2$]$_t$—(W)$_s$—[(R')$_2$SiO]$_q$—[Si(R')$_2$-G]$_t$—Si(R')$_{3-p}$—(OR")$_p$, (R"O)$_p$—Si(R')$_{3-p}$—[(R')$_2$SiO]—(W)$_s$—[(R')$_2$SiO]$_q$—Si(R')$_{3-p}$—(OR")$_p$; or

R-[G-Si(R')$_2$]$_t$—(W)$_s$—[(R')$_2$SiO]$_q$—[Si(R')$_2$-G]$_t$—[Si(R')$_{3-p}$—(OR")$_p$], wherein:
G and W are each divalent linking groups independently selected from oxy, alkylene, arylene, hetroarylene, cycloalkylene, and hetrocycloalkylene; R is selected from alkyl, alkylene, fluoroalkyl, aryl, fluoroaryl, cycloalkyl, fluorocycloalkyl, etroalkyl, hetrofluoroalkyl, hetroaryl, hetrofluoroaryl, hetrocycloalkyl, and hetrofluorocycloalkyl; each R' is independently selected from alkyl, alkylene, fluoroalkyl, aryl, fluoroaryl, cycloalkyl, fluorocycloalkyl, hetroalkyl, hetrofluoroalkyl, hetroaryl, hetrofluoroaryl, hetrocycloalkyl, hetrofluorocycloalkyl, oxyalkyl, oxyalkylene, oxyfluoroalkyl, oxyaryl, oxyfluoroaryl, oxycycloalkyl, oxyfluorocycloalkyl, oxyhetroalkyl, oxyhetrofluoroalkyl, oxyhetroaryl, oxyhetrofluoroaryl, oxyhetrocycloalkyl, and oxyhetrofluorocycloalkyl; each R" is independently selected from alkyl, preferably methyl or ethyl; p is an integer selected from 1, 2 or 3; each q is independently selected as an integer of 0-150, inclusive; s is selected as an integer of 0-40, inclusive; and each t is independently selected as an integer of 0 or 1.

NN. A process comprising:
(a) applying the composition of any preceding embodiment to at least a portion of a substrate; and
(b) curing the composition to form a cross-linked coating on the substrate.

OO. An article comprising the cross-linked coating prepared by the process of embodiment NN, wherein the at least a portion of the substrate is at least one major surface of the substrate, optionally wherein the cross-linked coating contacts the at least one major surface of the substrate.

PP. The article of embodiment OO, wherein the article further comprises a layer of a pressure-sensitive adhesive prepared by application of a photopolymerizable composition to the cross-linked coating, followed by irradiation of the photopolymerizable composition to effect photo-polymerization thereof.

Various aspects and advantages of exemplary embodiments of the present disclosure have been summarized. The above Summary is not intended to describe each illustrated embodiment or every implementation of the present disclosure. The Detailed Description that follows more particu-

DETAILED DESCRIPTION

Throughout the specification, the recitation of numerical ranges by endpoints includes all numbers subsumed within that range (e.g., 1 to 5 includes 1, 1.5, 2, 2.75, 3, 3.8, 4, and 5). Unless otherwise indicated, all numbers expressing quantities or ingredients, measurement of properties and so forth used in the specification and embodiments are to be understood as being modified in all instances by the term 'about.' Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

The terms "about" or "approximately" with reference to a numerical value or a shape means+/−five percent of the numerical value or property or characteristic, but expressly includes the exact numerical value. For example, a temperature of "about" 100° C. refers to a temperature from 95° C. to 105° C., but also expressly includes a temperature of exactly 100° C.

The term "substantially" with reference to a property value or characteristic means that the property or characteristic is exhibited to within 1% of that property value or characteristic. For example, a composition that is substantially free of an organic solvent generally contains no more than 1% w/w of an organic solvent, more advantageously less than 0.75% w/w of an organic solvent, less than 0.5% w/w of an organic solvent, less than 0.25% w/w of an organic solvent, less than 0.1% w/w of an solvent, and preferably 0.0% w/w of an organic solvent, based on the entire weight of the composition.

The terms "a," "an," "the," "at least one," and "one or more" are used interchangeably, and include plural referents unless the content clearly dictates otherwise. Thus, for example, reference to a material containing "a compound" includes a mixture of two or more compounds.

The term "or" is generally employed in its sense including "and/or" unless the content clearly dictates otherwise.

The term "comprises" and variations thereof do not have a limiting meaning where these terms appear in the description and claims.

The terms "room temperature" and "ambient temperature" are used interchangeably to mean temperatures in the range of 20° C. to 25° C.

The term "monomer(s)" or "monomeric material(s)" refer to organic compounds having a relatively low molecular weight (e.g., generally less than 200 Da), and which may undergo chemical self-reaction (e.g., polymerization) or chemical reaction with other monomers (e.g., copolymerization) to form longer chain oligomers, polymers and copolymers.

The terms "polymer(s)" and "polymeric material(s)" refer to organic compounds having a weight average molecular weight of at least 10,000 Da and prepared from a single type of monomer.

The terms "copolymer(s)" and "copolymeric material(s)" refer to organic compounds having a weight average molecular weight of at least 10,000 Da and prepared from at least two monomers. The term "copolymer" includes random, block and star (e.g., dendritic) copolymers.

The terms "(co)polymer(s)" and "(co)polymeric material" refer to both polymeric materials prepared from one monomer such as a homopolymer, or to materials prepared from two or more monomers such as a copolymer, terpolymer, or the like. Thus, the terms "(co)polymer(s)" or "(co)polymeric material" encompass homopolymers and copolymers, as well as homopolymers or copolymers in a miscible blend, formed, e.g., by co-extrusion or by reaction, including, e.g., transesterification.

Likewise, the term "(co)polymerize" refers to the process of making a polymeric material that can be a homopolymer, copolymer, terpolymer, or the like.

The terms "oligomer(s)" and "oligomeric material(s)" refer to an organic compound prepared by reacting at least two different monomers and having a molecular weight less than the entanglement molecular weight (e.g., generally a weight average molecular weight of less than 10,000 Da). Oligomers comprise at least two repeat units derived from the two monomers.

The term "catenated heteroatom" means an atom other than carbon (for example, oxygen, nitrogen, or sulfur) that replaces one or more carbon atoms in a carbon chain (for example, so as to form a carbon-heteroatom-carbon chain or a carbon-heteroatom-heteroatom-carbon chain);

The term "cure" means conversion of oligomers to a cross-linked network (for example, through a catalyzed chemical reaction between different oligomers);

The term "fluoro" (for example, in reference to a group or moiety, such as in the case of "fluoroalkylene" or "fluoroalkyl" or "fluorocarbon") or "fluorinated" means only partially fluorinated such that there is at least one carbon-bonded hydrogen atom;

The term "fluorochemical" means fluorinated or perfluorinated;

The term "heteroorganic" means an organic group or moiety (for example, an alkyl or alkylene group) containing at least one heteroatom (advantageously, at least one catenated heteroatom);

The term "hydrosilyl" refers to a monovalent moiety or group comprising a silicon atom directly bonded to a hydrogen atom (for example, the hydrosilyl moiety can be of formula —Si(R')$_{3-p}$(H)$_p$, where p is an integer of 1, 2, or 3 and R' is a hydrolyzable or non-hydrolyzable group (advantageously, non-hydrolyzable group) such as alkyl or aryl);

The term "hydroxysilyl" refers to a monovalent moiety or group comprising a silicon atom directly bonded to a hydroxyl group (for example, the hydroxysilyl moiety can be of formula —Si(R')$_{3-p}$(OH)$_p$ where p is an integer of 1, 2, or 3 and R' is a hydrolyzable or non-hydrolyzable group (advantageously, non-hydrolyzable group) such as alkyl or aryl);

The term "Lewis acid" means a molecular entity (and the corresponding chemical species) that is an electron-pair acceptor and therefore able to react with a Lewis base to form a Lewis adduct by sharing the electron pair furnished by the Lewis base;

The term "mercapto" means a monovalent group or moiety of formula —SH;

The term "oxy" means a divalent group or moiety of formula —O—; and

The term "perfluoro" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine.

Various exemplary embodiments of the present disclosure will now be described. Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Materials

In exemplary embodiments, the present disclosure provides curable compositions including dual reactive silane functionality. The compositions include:

(a) at least one organosiloxane compound, fluorinated organosiloxane compound, or combination thereof having reactive silane functionality including at least two hydroxysilyl moieties (that is, monovalent moieties comprising a hydroxyl group bonded directly to a silicon atom);

(b) at least one organosiloxane oligomer, fluorinated organosiloxane oligomer, or combination thereof having reactive silane functionality including at least two hydrosilyl moieties (that is, monovalent moieties comprising a hydrogen atom bonded directly to a silicon atom); and (c) a catalyst composition including: (1) at least one base selected from amidines, guanidines, phosphazenes, proazaphosphatranes, and combinations thereof, and (2) at least one Lewis acid;

wherein at least one of components (a) and (b) has an average reactive silane functionality of at least three (that is, component (a) has at least three hydroxysilyl moieties (on average), component (b) has at least three hydrosilyl moieties (on average), or both), and further wherein the composition is substantially free of an organic solvent.

Components (a) and (b) advantageously each include an organosiloxane oligomer having a weight average molecular weight no greater than 5,000 Da. Advantageously, each organosiloxane oligomer is a dimethylsiloxane oligomer. Advantageously, component (a) is hydroxyl-endblocked, so as to comprise two terminal hydroxysilyl moieties (on average).

The base of component (c) advantageously comprises at least one amidine or guanidine (advantageously selected from 1,2-dimethyl-1,4,5,6-tetrahydropyrimidine, 1,8-diazabicyclo[5.4.0]-7-undecene (DBU), 1,5-diazabicyclo[4.3.0]-5-nonene (DBN), 1,5,7-triazabicyclo[4.4.0]dec-5-ene (TBD), 7-methyl-1,5,7-triazabicyclo[4.4.0]dec-5-ene (MTBD), 2-tert-butyl-1,1,3,3-tetramethylguanidine, and combinations thereof, and most advantageously, 1,8-diazabicyclo[5.4.0]-7-undecene (DBU)). Optionally, the curable compositions further include at least one carboxylic acid (e.g., acetic acid) or anhydride, and additionally, a metal salt (e.g., Zinc(II) ethylhexanoate) having at least one metal cation that acts as a Lewis acid.

Component (a)

Organosiloxane compounds suitable for use as component (a) of the curable compositions of the present disclosure include organosiloxane compounds and more advantageously organosiloxane oligomers, fluorinated organosiloxane oligomers, and combinations thereof (more advantageously, dialkylsiloxane oligomers) comprising reactive silane functionality comprising at least two hydroxysilyl moieties (that is, monovalent moieties comprising a hydroxyl group bonded directly to a silicon atom).

The molecular weight and the reactive silane functionality of component (a) (including the number and nature of the hydroxysilyl moieties of the organosiloxane compound) can vary widely, depending upon, for example, the molecular weight and the reactive silane functionality of component (b) and the properties desired for the curable and/or cured composition. At least one of components (a) and (b) has an average reactive silane functionality of at least three, however (that is, component (a) has at least three hydroxysilyl moieties (on average), component (b) has at least three hydrosilyl moieties (on average), or both), so as to enable the formation of a cross-linked network.

Advantageously, the organosiloxane compound, fluorinated organosiloxane compound, and combinations thereof used for component (a) are hydroxyl-endblocked, so as to comprise two terminal hydroxysilyl moieties (on average). The polysiloxanes advantageously have a weight average molecular weight of about 150 to about 1,000,000 (more advantageously, about 1,000 to about 1,000,000).

An advantageous class of useful organosiloxane compounds includes organosiloxane oligomers that can be represented by the following general formula:

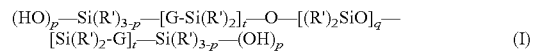

$$(HO)_p—Si(R')_{3-p}—[G-Si(R')_2]_t—O—[(R')_2SiO]_q— [Si(R')_2-G]_t—Si(R')_{3-p}—(OH)_p \qquad (I)$$

wherein each G is independently a divalent linking group; each R' is independently selected from alkyl, fluoroalkyl, aryl, fluoroaryl, cycloalkyl, fluorocycloalkyl, heteroalkyl, heterofluoroalkyl, heteroaryl, heterofluoroaryl, heterocycloalkyl, and heterofluorocycloalkyl; p is independently an integer of 1, 2, or 3 (advantageously, 1); q is an integer of 0 to about 150 (advantageously, about 20 to about 100); and each t is independently an integer of 0 or 1 (advantageously, 0).

Advantageously, each R' is independently selected from alkyl (advantageously, having 1 to about 8 carbon atoms), aryl, fluoroalkyl (advantageously, having 3 to about 8 carbon atoms), with alkyl being most advantageous. More advantageously, each R' is independently selected from —$R_fC_2H_4$, wherein $R_f$ is a fluorinated or advantageously, perfluorinated, alkyl group having 1 to about 6 carbon atoms (more advantageously, having 1 to 2 carbon atoms).

Even more advantageously, each R' is independently selected from methyl, phenyl, —$C_4F_9C_2H_4$, —$C_6F_{13}C_2H_4$, —$CF_3C_2H_4$, —$C_6H_5C_2H_4$; even more advantageously methyl, phenyl, —$CF_3C_2H_4$, —$C_4F_9C_2H_4$. Most advantageously, each R' is methyl.

Each divalent linking group, G, is advantageously independently selected from oxy, alkylene, arylene, heteroalkylene, heteroarylene, cycloalkylene, heterocycloalkylene; more advantageously, each G is independently selected from oxy, alkylene, arylene, and combinations thereof).

Heteroatoms (in G and/or R') can include oxygen, sulfur, nitrogen, phosphorus, and combinations thereof (advantageously, oxygen, sulfur, and combinations thereof; more advantageously, oxygen). G can contain fluorine, provided that it is separated from silicon by at least two carbon atoms.

Suitable non-fluorinated or fluorinated organosiloxane compounds useful as component (a) include, but are not limited to, alkoxysilanes, more advantageously, mono-, di- or tri-alkoxy end-capped alkoxysilanes. However, the alkoxy functionality need not be terminal, and combinations of non-terminal alkoxy groups and terminal alkoxy groups may be used advantageously. Non-limiting examples of suitable non-fluorinated organosiloxane compounds include 1,3-Di-n-octyltetraethoxydisiloxane (available as SID-4402), n,n'-Bis-[(3-triethoxysilylpropyl)-aminocarbonyl] polyethylene oxide (weight-average molecular weight: 1,000-1,200 Da, 10-15% ethylene oxide) (available as SIB-1824), and 1,3-Di-n-octyltetraethoxydisiloxane, all available from Gelest, Inc. (Morrisville, Pa.). Non-limiting examples of suitable fluorinated organosiloxane compounds include heptadecafluoro-1,1,2,2-tetrahydroxydecyl-triethoxysilane and 3,3,3-trifluoropropyl)trimethoxysilane, available from Alfa Aesar (Ward Hill, Mass.).

Particularly advantageous non-fluorinated or fluorinated organosiloxane compounds are organosiloxane oligomers including at least two hydroxysilyl moieties. Non-limiting examples of suitable non-fluorinated organosiloxane oligomers including two hydroxysilyl moieties include silanol end-capped (terminated) dimethylsiloxanes such as, for example, DMS-S12 (weight-average molecular weight: 400~700 Da), DMS-S14 weight-average molecular weight: 700~1,500 Da), DMS-S15 weight-average molecular weight: 2,000~3,500 Da), DMS-S27 (weight-average molecular weight: 2,000~3,500 Da), DMS-S42 (weight-average molecular weight: 900~1,000 Da), all available from Gelest, Inc. (Morrisville, Pa.); Z-6018 (weight-average molecular weight: 1,500-2,500 Da, hydroxyl group content: 6.0 wt %); 249 (weight-average molecular weight: 2,000-4,000 Da, hydroxyl group content: 5.0 wt %); 220 (weight-average molecular weight: 2,000-4,000 Da, hydroxyl group content: 1.0 wt %); 217 (weight-average molecular weight: 1,500-2,500 Da, hydroxyl group content: 6.0 wt %), all available from Dow Corning Corporation, Midland, Mich.); KR220 L (weight-average molecular weight: 2,000-4,000 Da, hydroxyl group content: 4.0 wt %), available from ShinEtsu Silicones of America (Akron, Ohio); and MK (weight-average molecular weight: 2,000-4,000 Da, hydroxyl group content: 1.0 wt %), available from Wacker Chemical Co. North America (Adrian, Mich.).

Non-limiting examples of suitable fluorinated organosiloxane oligomers include silanol terminated polytrifluoropropylmethylsiloxanes such as, for example FMS 9991 (weight-average molecular weight: 550-800 Da) and FMS 9992 (weight-average molecular weight: 800-1,200 Da), both available from Gelest, Inc. (Morrisville, Pa.).

Particularly advantageous organosiloxane oligomers include hydroxyl-endblocked dimethylsiloxane oligomers, as well as hydroxyl-endblocked oligomers comprising dimethylsiloxane units and up to about 40 or 50 mole percent of other units selected from dialkylsiloxane units, (alkyl)(methyl)siloxane units, and (alkyl)(phenyl)siloxane units wherein each alkyl group is independently selected from alkyl groups having two to about 8 carbon atoms (for example, hexyl), di(fluoroalkyl)siloxane units, (fluoroalkyl) (methyl)siloxane units, and (fluoroalkyl)(phenyl)siloxane units wherein each fluoroalkyl group is independently selected from fluoroalkyl groups having 3 to about 8 carbon atoms (for example, trifluoropropyl or nonafluorohexyl), diphenylsiloxane units, and combinations thereof.

The organosiloxane oligomers useful as component (a) can be used in the curable composition of the present disclosure singly or in the form of mixtures of different organosiloxanes, or even mixtures with minor amounts of polysiloxanes. The polysiloxanes suitable for use as a minor component in component (a) can be prepared by known synthetic methods and many are commercially available. For example, the hydroxysilyl-functional components of Syl-Off™ 292 coating composition (available from Dow Corning Corporation, Midland, Mich.) are advantageous polysiloxanes, and other useful polysiloxanes of varying molecular weight can be obtained from Gelest, Inc., Morrisville, Pa. (see, for example, the polysiloxanes described in *Silicon Compounds: Silanes and Silicones*, Second Edition, edited by B. Arkles and G. Larson, Gelest, Inc. (2008)).

Such mixtures can be advantageous, particularly in controlling the cure time and pot life of the composition once activated by addition of the catalyst (component (c)). In general, the higher the amount, molecular weight and alkoxy functionality of the polysiloxane(s) added as minor component(s) of the curable composition, the shorter the cure time and pot life of the activated composition.

One particularly advantageous composition for use as component (a) comprises a mixture of (1) at least one organosiloxane oligomer, fluorinated organosiloxane oligomer, or combination thereof having a weight average molecular weight less than 10,000 Da (and more advantageously, having a weight average molecular weight no greater than 7,500 Da, 5,000 Da, 4,000 Da, 3,000 Da, 2,000 Da, or even 1,000 Da), and (2) at least one polysiloxane having a weight average molecular weight in the range of about 10,000 to about 1,000,000 Da (more advantageously, about 50,000 to about 500,000 Da; most advantageously, about 75,000 to about 250,000 Da). The relative amounts of component (1) and component (2) and their molecular weights and functionality can be selected for release applications according to the nature of the adhesive (or other material) to be used with the cured release composition and the level of release desired.

For example, for mold release applications, the weight ratio of the former organosiloxane oligomer(s) to the latter polysiloxane(s) can range from about 2:1 to about 19:1 (advantageously, about 3:1 to about 15:1; more advantageously, about 4:1 to about 7:1). For pressure sensitive adhesive (PSA) release applications, the weight ratio of the former organosiloxane oligomer(s) to the latter polysiloxane(s) can range, for example, from about 1:1 to about 10:1 (advantageously, about 2:1 to about 8:1; more advantageously, about 3:1 to about 6:1).

Component (b)

Organosiloxanes suitable for use as crosslinker component (b) of the curable composition of the present disclosure include organosiloxane oligomers, fluorinated organosiloxane oligomers, and combinations thereof (advantageously, organosiloxane oligomers; more advantageously, alkyl(hydro)siloxanes) comprising reactive silane functionality comprising at least two hydrosilyl moieties (that is, monovalent moieties comprising a hydrogen atom bonded directly to a silicon atom). The organosiloxane oligomers can be linear, branched, or cyclic. Useful oligomers include those that have random, alternating, block, or graft structures, or a combination thereof.

The molecular weight and the reactive silane functionality of component (b) (including the number and nature of the hydrosilyl moieties) can vary widely, depending upon, for example, the molecular weight and the reactive silane functionality of component (a) and the properties desired for the curable and/or cured composition. Advantageously, component (b) has an average reactive silane functionality of at least three (so as to enable the formation of a cross-linked network when component (a) is hydroxyl-endblocked). The organosiloxane oligomers advantageously have a weight average molecular weight of about 150 to no greater than 10,000 Da, more advantageously no greater than 5,000 Da, no greater than 4,000 Da, no greater than 3,000 Da, no greater than 2,000 Da, no greater than 1,000 Da, no greater than 750 Da, or even no greater than 500 Da.

One advantageous class of organosiloxane oligomers includes those that can be represented by the following general formula:

$$R'_2R''SiO(R'_2SiO)_r(HR'SiO)_sSiR''R'_2 \quad (II)$$

wherein R' is as defined above for Formula (I); each R'' is independently hydrogen (hydro) or R'; r is an integer of 0 to about 150 (advantageously, 0 to about 100; more advantageously, 0 to about 20); and s is an integer of 2 to about 150 (advantageously, about 5 to about 100; more advantageously, about 20 to about 80). Most advantageously, both R'' and R' are methyl, r is 0, and/or s is about 40.

Advantageous hydride-functional organosiloxane oligomers include those comprising methyl(hydro)siloxane units, as well as those comprising methyl(hydro)siloxane units and up to about 40 or 50 mole percent of other units selected from dialkylsiloxane units, (alkyl)(methyl)siloxane units, and (alkyl)(phenyl)siloxane units wherein each alkyl group is independently selected from alkyl groups having two to about 8 carbon atoms (for example, hexyl), di(fluoroalkyl)siloxane units, (fluoroalkyl)(methyl)siloxane units, and (fluoroalkyl)(phenyl)siloxane units wherein each fluoroalkyl group is independently selected from fluoroalkyl groups having 3 to about 8 carbon atoms (for example, trifluoropropyl or nonafluorohexyl), diphenylsiloxane units, and combinations thereof.

Non-limiting examples of suitable organosiloxane hydrosilyl-functional oligomers useful as component (b) include, but are not limited to, SYLOFF™-7048 (weight-average molecular weight: 4,000-5,000 Da, hydrogen content: 1.58-1.60 wt %), 7672 (weight-average molecular weight: 9,000-10,000 Da, hydrogen content: 0.9 wt %), 1107 (weight-average molecular weight: 4,000 Da, hydrogen content: 1.60 wt %), and F1-3546 (weight-average molecular weight: 8,700 Da, hydrogen content: 0.1-1 wt %), all available from Dow Corning (Midland, Mich.); TSF-484 (weight-average molecular weight: 4,000-5,000 Da, hydrogen content: L58 wt %), available from Momentive Company (Columbus, Ohio); KF99 (weight-average molecular weight: 4,000-5,000 Da, hydrogen content: 1.58-1.60 wt %), available from ShinEtsu Silicones of America (Akron, Ohio); 202 methyl hydrosilicone oil (weight-average molecular weight: 1,700 Da, hydrogen content: 1.58-1.60 wt %), available from Bluestar Silicones U.S.A. (New Brunswick, N.J.); and HMS-301 (weight-average molecular weight: 1,900-2,000 Da, hydrogen content: 0.40 wt %), available from Gelest, Inc. (Morrisville, Pa.).

The organosiloxane oligomers useful as component (b) can be used in the curable composition of the present disclosure singly or in the form of mixtures of different organosiloxane oligomers or even mixtures with small amounts (e.g., less than about 33% w/w, more advantageously less than 25% w/w, 20% w/w, 15% w/w, 10% w/w or even less than 5% w/w based on the total weight of the composition) of high molecular weight (e.g., at least 10,000 Da up to about 1 million Da) polysiloxanes. Suitable high molecular weight polysiloxanes can be prepared by known synthetic methods and many are commercially available.

For example, Syl-Off™ Q2-7560 crosslinker, Syl-Off™ 7678 crosslinker, and the hydrosilyl-functional component (for example, Syl-Off™ 7048 crosslinker) of Syl-Off™ 292 and Syl-Off™ 294 coating compositions (all available from Dow Corning Corporation, Midland, Mich.) are advantageous polysiloxanes, and other useful polysiloxane cross-linkers of varying molecular weight can be obtained from Gelest, Inc., Morrisville, Pa. (see, for example, the polysiloxanes described in *Silicon Compounds: Silanes and Silicones*, Second Edition, edited by B. Arkles and G. Larson, Gelest, Inc. (2008)).

Component (c)

The curable composition includes component (c), a catalyst composition comprising (1) at least one base selected from amidines, guanidines, phosphazenes, proazaphosphatranes, and combinations thereof, and (2) at least one Lewis acid;

Bases suitable for use in component (c) (the catalyst composition) of the curable composition of the present disclosure include amidines, guanidines (including substituted guanidines such as biguanides), phosphazenes, proazaphosphatranes (also known as Verkade's bases), and combinations thereof. Self-protonatable forms of the bases (for example, aminoacids such as arginine) generally are less suitable and therefore excluded, as such forms are self-neutralized and therefore insoluble in the curable composition. Advantageous bases include amidines, guanidines, and combinations thereof (more advantageously, amidines and combinations thereof; most advantageously, cyclic amidines and combinations thereof).

The bases can be used in the curable composition singly (individually) or in the form of mixtures of one or more different bases (including bases from different structural classes). If desired, the base(s) can be present in photo-latent form (for example, in the form of an activatable composition that, upon exposure to radiation or heat, generates the base(s) in situ).

It has been discovered that, unlike standard amine bases such as 4,4'-trimethylenebis(1-methylpiperidine) (which are generally ineffective), the above-described bases can effectively catalyze the curing (apparently, by dehydrocondensation) of polysiloxane compositions comprising reactive silane functionality in the form of hydrosilyl and hydroxysilyl moieties. The bases can provide relatively rapid cure (for example, curing can occur within periods of time as short as about 1 minute) even at temperatures as low as ambient (for example, about 23° C.), without the need for heat activation, and can be effective in relatively small amounts (for example, at concentrations as low as about 0.5 weight percent or less, based upon the total weight of components (a), (b), and (c)).

Thus, polysiloxane compositions comprising the bases can be suitable for use in high speed coating and curing operations in an industrial setting, without the need for addition of heat. In spite of such effective curability, the compositions can exhibit relatively good storage stability (for example, for a period of days in a closed container) and/or relatively long pot life (for example, on the order of 8 hours or more), maintaining a viscosity (e.g., a viscosity, measured at a shear rate of 100 sec$^{-1}$ at room temperature, of less than 10,000 mPa-s, more advantageously less than 5,000 mPa-s, even more advantageously less than 1,000 mPa-s, 500 mPa-s, or even 100 MPa-s) suitable for application of the composition to a major surface of a substrate using conventional coating techniques, even in the absence of organic solvents (e.g., heptane, toluene, methyl ethyl ketone, and the like), and without the need for mixing of a two-part system immediately prior to use.

Useful amidines include those that can be represented by the following general formula:

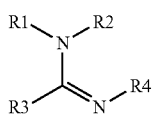

(III)

wherein R1, R2, R3, and R4 are each independently selected from hydrogen, monovalent organic groups, monovalent heteroorganic groups (for example, comprising nitrogen, oxygen, phosphorus, silicon, or sulfur in the form of groups or moieties that are advantageously bonded through a carbon atom and that do not contain acid functionality such as carboxylic or sulfonic), and combinations thereof; and wherein any two or more of R1, R2, R3, and R4 optionally can be bonded together to form a ring structure (advantageously, a five-, six-, or seven-membered ring; more advantageously, a six- or seven-membered ring). The organic and heteroorganic groups advantageously have from 1 to about 20 carbon atoms (more advantageously, from 1 to about 10 carbon atoms; most advantageously, from 1 to about 6 carbon atoms). Advantageously, R4 is not hydrogen.

Amidines comprising at least one ring structure (that is, cyclic amidines) are generally advantageous. Cyclic amidines comprising two ring structures (that is, bicyclic amidines) are more advantageous.

Representative examples of useful amidine compounds include 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrimidine, 1-ethyl-2-isopropyl-1,4,5,6-tetrahydropyrimidine, DBU (that is, 1,8-diazabicyclo[5.4.0]-7-undecene), DBN (that is, 1,5-diazabicyclo[4.3.0]-5-nonene), and the like, and combinations thereof. Advantageous amidines include 1,2-dimethyl-1,4,5,6-tetrahydropyrimidine, DBU (that is, 1,8-diazabicyclo[5.4.0]-7-undecene), DBN (that is, 1,5-diazabicyclo[4.3.0]-5-nonene), and combinations thereof, with DBU, DBN, and combinations thereof being more advantageous and DBU most advantageous.

Useful guanidines include those that can be represented by the following general formula:

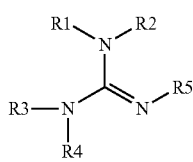

(IV)

wherein R1, R2, R3, R4, and R5 are each independently selected from hydrogen, monovalent organic groups, monovalent heteroorganic groups (for example, comprising nitrogen, oxygen, phosphorus, silicon, or sulfur in the form of groups or moieties that are advantageously bonded through a carbon atom and that do not contain acid functionality such as carboxylic or sulfonic), and combinations thereof; and wherein any two or more of R1, R2, R3, R4, and R5 optionally can be bonded together to form a ring structure (advantageously, a five-, six-, or seven-membered ring; more advantageously, a five- or six-membered ring; most advantageously, a six-membered ring). The organic and heteroorganic groups advantageously have from 1 to about 20 carbon atoms (more advantageously, from 1 to about 10 carbon atoms; most advantageously, from 1 to about 6 carbon atoms). Advantageously, R5 is not hydrogen.

Guanidines comprising at least one ring structure (that is, cyclic guanidines) are generally advantageous. Cyclic guanidines comprising two ring structures (that is, bicyclic guanidines) are more advantageous.

Representative examples of useful guanidine compounds include 1-methylguanidine, 1-n-butylguanidine, 1,1-dimethylguanidine, 1,1-diethylguanidine, 1,1,2-trimethylguanidine, 1,2,3-trimethylguanidine, 1,3-diphenylguanidine, 1,1,2,3,3-pentamethylguanidine, 2-ethyl-1,1,3,3-tetramethylguanidine, 1,1,3,3-tetramethyl-2-n-propylguanidine, 1,1,3,3-tetramethyl-2-isopropylguanidine, 2-n-butyl-1,1,3,3-tetramethylguanidine, 2-tert-butyl-1,1,3,3-tetramethylguanidine, 1,2,3-tricyclohexylguanidine, TBD (that is, 1,5,7-triazabicyclo[4.4.0]dec-5-ene), MTBD (that is, 7-methyl-1,5,7-triazabicyclo[4.4.0]dec-5-ene), 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-isobutyl-1,5,7-triazabicyclo[4.4.0]dec-5-ene, 7-tert-butyl-1,5,7-triazabicyclo[4.4.0]dec-5-ene, 7-cyclohexyl-1,5,7-triazabicyclo[4.4.0]dec-5-ene, 7-n-octyl-1,5,7-triazabicyclo[4.4.0]dec-5-ene, 7-2-ethylhexyl-1,5,7-triazabicyclo[4.4.0]dec-5-ene, 7-decyl-1,5,7-triazabicyclo[4.4.0]dec-5-ene, biguanide, 1-methylbiguanide, 1-n-butylbiguanide, 1-(2-ethylhexyl)biguanide, 1-n-octadecylbiguanide, 1,1-dimethylbiguanide, 1,1-diethylbiguanide, 1-cyclohexylbiguanide, 1-allylbiguanide, 1-n-butyl-N2-ethylbiguanide, 1,1'-ethylenebisguanide, 1-[3-(diethylamino)propyl]biguanide, 1-[3-(dibutylamino)propyl]biguanide, N',N'''-dihexyl-3,12-diimino-2,4,11,13-tetraazatetradecanediamidine, and the like, and combinations thereof. Advantageous guanidines include TBD (that is, 1,5,7-triazabicyclo[4.4.0]dec-5-ene), MTBD (that is, 7-methyl-1,5,7-triazabicyclo[4.4.0]dec-5-ene), 2-tert-butyl-1,1,3,3-tetramethylguanidine, and combinations thereof. More advantageous are TBD, MTBD, and combinations thereof.

If desired, the amidines and guanidines can be selected from those exhibiting a pH value lower than 13.4 when measured according to JIS Z 8802 (for example, 1,3-diphenylguanidine, DBU, DBN, or a combination thereof; advantageously, DBU, DBN, or a combination thereof). The referenced method for determining the pH of aqueous solutions, JIS Z 8802, is carried out by first preparing an aqueous solution of base by adding 5 millimoles of base to 100 g of a mixed solvent composed of isopropyl alcohol and water in a weight ratio of 10:3. The pH of the resulting solution is then measured at 23° C. using a pH meter (for example, a Horiba Seisakusho Model F-22 pH meter).

Useful phosphazenes include those that can be represented by the following general formula:

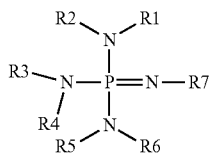
(V)

wherein R1, R2, R3, R4, R5, R6, and R7 are each independently selected from hydrogen, monovalent organic groups, monovalent heteroorganic groups (for example, comprising nitrogen, oxygen, phosphorus, silicon, or sulfur in the form of groups or moieties that are advantageously bonded through a carbon atom and that do not contain acid functionality such as carboxylic or sulfonic), and combinations thereof; and wherein any two or more of R1, R2, R3, R4, R5, R6, and R7 optionally can be bonded together to form a ring structure (advantageously, a five-, six-, or seven-membered ring; more advantageously, a five- or six-membered ring; most advantageously, a six-membered ring). The organic and heteroorganic groups advantageously have from 1 to about 20 carbon atoms (more advantageously, from 1 to about 10 carbon atoms; most advantageously, from 1 to about 6 carbon atoms). Advantageously, R7 is not hydrogen.

Representative examples of useful phosphazene compounds include:

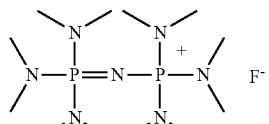

1,1,1,3,3,3-hexakis(dimethylamino)-diphosphazenium fluoride

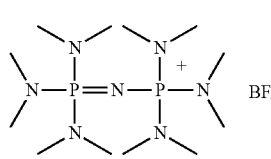

1,1,1,3,3,3-hexakis(dimethylamino)-diphosphazenium tetrafluoroborate

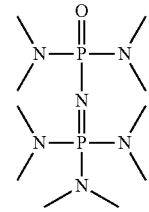

1,1,3,3,3-pentakis-(dimethylamino)-1$\lambda^5$, 3$\lambda^5$-diphosphazene 1-oxide

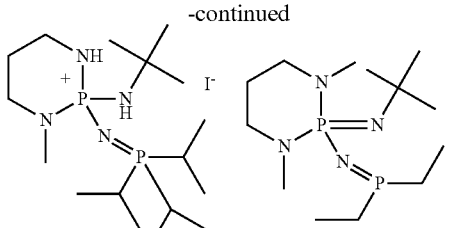

2-tert-butylamino-1-methyl-2-[tris(dimethylamino)-phosphoranylidenamino]-perhydro-1,3,2-diazaphosphorinium iodide 2-tert-butylamino-2-diethylamino-1,3-dimethylperhydro-1,3,2-diazaphosphorine

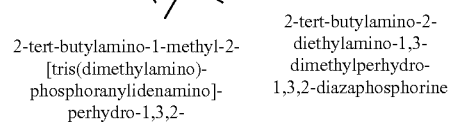

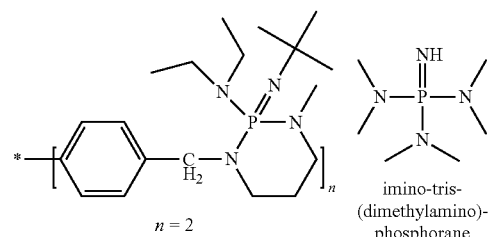

n = 2
2-tert-butylimino-2-diethylamino-1,3-dimethylperhydro-1,3,2-diazaphosphorine imino-tris-(dimethylamino)-phosphorane

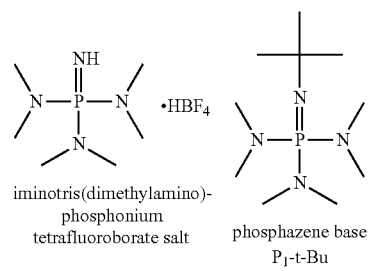

iminotris(dimethylamino)-phosphonium tetrafluoroborate salt phosphazene base P$_1$-t-Bu

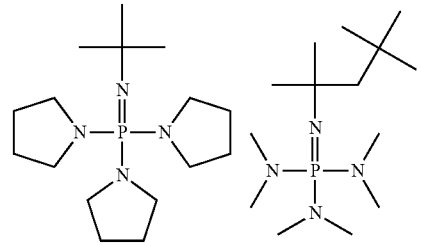

phosphazene base P$_1$-t-Bu-tris(tetramethylene) purum phosphazene base P$_1$-t-Oct

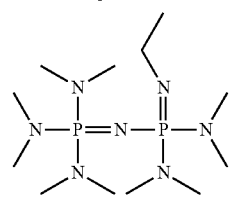

phosphazene base P$_2$-Et purum

-continued

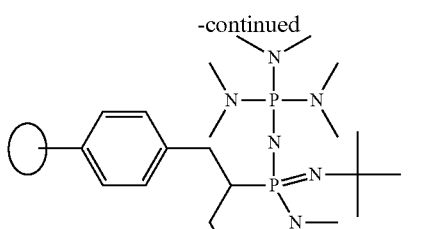

phosphazene base P₂-t-Bu

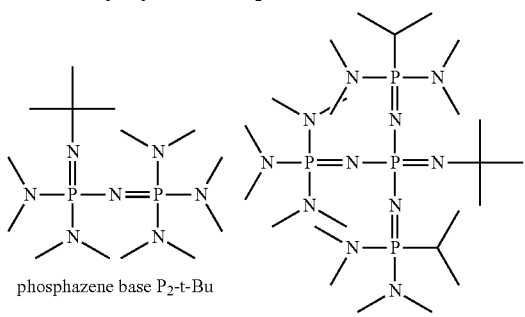

phosphazene base P₂-t-Bu phosphazene base P₄-t-Bu

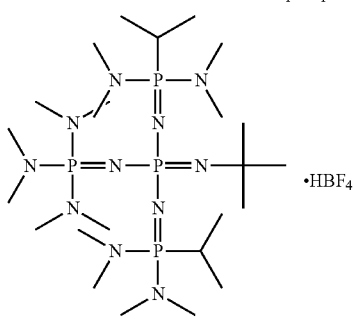

·HBF₄ phosphazene base P₄-t-Bu tetrafluoroborate salt

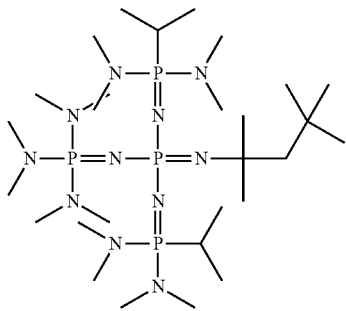

phosphazene base P₄-t-Oct

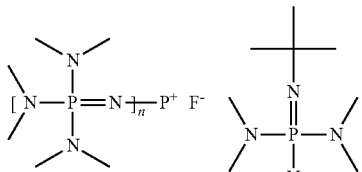

n = 4
tetrakis[tris-(dimethylamino)-phosphoranylidenamino] phosphonium fluoride tert-butylimino-tris-(dimethylamino)-phosphorane and the like, and combinations thereof. Advantageous phosphazenes include 2-tert-butylimino-2-diethylamino-1,3-dimethylperhydro-1,3,2-diazaphosphorine, phosphazene base P₁-t-Bu-tris(tetramethylene), phosphazene base P₄-t-Bu, and combinations thereof.

Useful proazaphosphatrane bases (Verkade's bases) include those that can be represented by the following general formula:

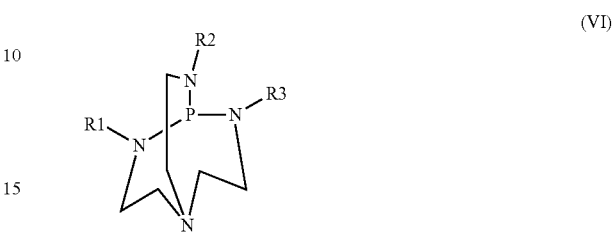

(VI)

wherein R1, R2, and R3 are each independently selected from hydrogen, monovalent organic groups, monovalent heteroorganic groups (for example, comprising nitrogen, oxygen, phosphorus, silicon, or sulfur in the form of groups or moieties that are advantageously bonded through a carbon atom and that do not contain acid functionality such as carboxylic or sulfonic), and combinations thereof (less advantageously hydrogen). The organic and heteroorganic groups advantageously have from 1 to about 20 carbon atoms (more advantageously, from 1 to about 10 carbon atoms; most advantageously, from 1 to about 6 carbon atoms).

Representative examples of useful proazaphosphatrane compounds include:

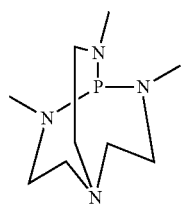

2,8,9-trimethyl-2,5,8,9-tetraaza-1-phosphabicyclo[3.3.3]undecane

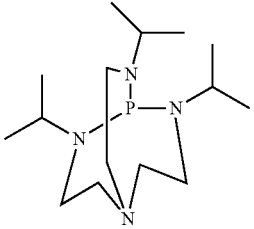

2,8,9-triisopropyl-2,5,8,9-tetraaza-1-phosphabicyclo[3.3.3]undecane

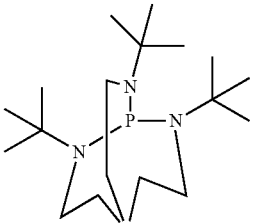

2,8,9-triisobutyl-2,5,8,9-tetraaza-1-phosphabicyclo[3.3.3]undecane and the like, and combinations thereof. 2,8,9-triisopropyl-2,5,8,9-tetraaza-1-phosphabicyclo[3.3.3]undecane is an advantageous proazaphosphatrane compound.

It has also been discovered that the catalytic activity or curing performance of the bases surprisingly can be further enhanced and/or controlled by the addition of Lewis acid(s). When a catalyst composition comprising at least one base and at least one Lewis acid is used, somewhat higher processing temperatures can be utilized (for example, without significant curing occurring below temperatures of about 50° C.) and/or byproduct formation and outgassing can be reduced or even essentially eliminated (for example, byproducts resulting from side reactions involving one or both polysiloxane components). Thus, the addition of Lewis acid surprisingly can further extend bath life and/or increase the degree of cure that can be achieved, resulting in lower levels of extractables upon curing. These unexpected improvements can be even further enhanced by the optional inclusion of at least one carboxylic acid or anhydride in the curable compositions.

Lewis acids suitable for use in component (c) (the catalyst composition) of the curable composition of the present disclosure include those that can coordinate or otherwise interact with the base to form an adduct or another inhibited or latent form of the base that is at least somewhat less reactive to components (a) and/or (b) than the base itself and that can be activated (for example, by heating; advantageously, under relatively mild conditions such as temperatures in the range of about 50° C. to about 120° C.) to release the base. Such Lewis acids include metal salts, triorganoborates including trialkylborates (including those represented by the formula $B(OR)_3$, wherein each R is independently alkyl) and triarylborates (including those represented by the formula $B(OR')_3$, wherein each R' is independently aryl), and the like, and combinations thereof (advantageously, metal salts, trialkylborates, and combinations thereof; more advantageously, metal salts and combinations thereof). If a metal-free composition is desired, however, trialkylborates and combinations thereof can be more advantageous than metal salts.

Useful metal salts include those that comprise at least one metal cation that acts as a Lewis acid. Advantageous metal salts include metal salts of organic acids and combinations thereof (more advantageously, metal carboxylates (including both aliphatic and aromatic carboxylates; advantageously, having an equivalent weight in the range of about 45 to about 425) and combinations thereof; most advantageously, metal alkanoates (for example, alkanoates having up to about 18 carbon atoms; advantageously, up to about 10 carbon atoms) and combinations thereof). Useful metal cations include those that have at least one vacant orbital. Advantageous metals include zinc, iron, copper, bismuth, aluminum, magnesium, and combinations thereof (more advantageously, zinc, bismuth, aluminum, magnesium, and combinations thereof; even more advantageously, zinc, bismuth, and combinations thereof; most advantageously, zinc).

Representative examples of useful metal salts include the butyrate (butanoate), octanoate, neodecanoate, and ethylhexanoate salts of the above-listed advantageous metals, and the like, and combinations thereof. Advantageous metal salts include the butryrate (butanoate), octanoate, neodecanoate, and ethylhexanoate salts (most advantageously, ethylhexanoate salts) of the above-listed more advantageous metals, and combinations thereof. More advantageous metal salts include the butryrate (butanoate), octanoate, neodecanoate, and ethylhexanoate salts (most advantageously, ethylhexanoate salts) of the above-listed even more advantageous metals, and combinations thereof. Zinc(II) ethylhexanoate is particularly advantageous (for example, for solubility reasons). Such metal salts can be prepared by known methods, and some (for example, zinc(II) ethylhexanoate and bismuth(III) ethylhexanoate) are commercially available.

Useful trialkylborates include those that comprise alkyl groups having from one to about five carbon atoms. Representative examples of useful trialkylborates include trimethylborate, triethylborate, triisopropylborate, tributylborate, tripentylborate, and the like, and combinations thereof. Advantageous trialkylborates include trimethylborate, triethylborate, triisopropylborate, and combinations thereof (more advantageously, trimethylborate, triethylborate, and combinations thereof; most advantageously, trimethylborate). Such trialkylborates can be prepared by known methods, and some (for example, trimethylborate and triethylborate) are commercially available.

Useful triarylborates include those that have relatively low boiling points. Catalyst compositions comprising triarylborates can be somewhat less reactive than those comprising trialkylborates and can be used to allow higher-temperature and/or slower curing. Representative examples of useful triarylborates include triphenylborate, trinaphthylborate, tri(substituted phenyl)borates (for example, bearing one or more alkyl, alkoxy, or halogen substituents), tri(substituted naphthyl)borates (for example, bearing one or more alkyl, alkoxy, or halogen substituents), and the like, and combinations thereof. Advantageous triarylborates include triphenylborate, tri(substituted phenyl)borates, and combinations thereof (more advantageously, triphenylborate). Such triarylborates can be prepared by known methods, and some (for example, triphenylborate) are commercially available.

If desired, combinations of trialkylborates and triarylborates can be utilized, which combinations can be mixtures of the two and/or can include unsymmetrical borates such as alkyldiarylborates, aryldialkylborates, and combinations thereof.

The catalyst composition (component (c)) can be preformed or can be formed in situ by combining the Lewis acid and the base in the presence of components (a) and/or (b). If desired, the curable compositions can optionally further comprise at least one carboxylic acid, at least one carboxylic acid anhydride, or a combination thereof (which can be included in a pre-formed catalyst composition or can be added separately in essentially any order of addition or combination of the components of the curable compositions). Useful carboxylic acids and anhydrides include those that are relatively volatile (for example, having boiling points in the range of about 100° C. to about 150° C.). Advantageously, the carboxylic acids and anhydrides are also relatively odor-free.

Representative examples of useful carboxylic acids and anhydrides include acetic acid, acetic anhydride, lactic acid, lactic anhydride, propanoic acid, propanoic anhydride, pentanoic acid, pentanoic anhydride, and the like, and combinations thereof. Advantageous carboxylic acids and anhydrides include acetic acid, lactic acid, acetic anhydride, lactic anhydride, and combinations thereof (more advantageously, acetic acid, acetic anhydride, and combinations thereof; most advantageously, acetic acid).

In surprising contrast with prior art curable coating compositions, the catalyst compositions can be effective in the curable compositions of the present disclosure in the substantial absence of other condensation catalysts and/or in the substantial absence of moisture. The catalyst compositions can be used as substitutes for conventional tin catalysts to provide tin-free, curable compositions, without the need for changes in the nature of the polysiloxane components of conventional tin-cured polysiloxane compositions (e.g., release coating compositions such as Syl-Off™ 292 coating composition, available from Dow Corning Corporation, Midland, Mich.). Unlike the conventional tin catalysts, at least some of the catalyst compositions (for example, DBU and zinc alkanoate) are relatively non-toxic and therefore suitable for use in preparing relatively environmentally friendly or 'green' polysiloxane compositions.

Optional Alkoxysilane Component (d)

In certain presently preferred embodiments, the curable composition further comprises at least one alkoxysilane compound as a fourth component (d). The at least one alkoxysilane compound preferably includes 1-6 terminal alkoxy groups, which may be terminal to one or both ends of the alkoxysilane compound. The at least one alkoxysilane may be selected from:

$(OR")_p$—$Si(R')_{3-p}$—$[G-Si(R')_2]_t$—$(W)_s$—$[(R')_2SiO]_q$—$[Si(R')_2-G]_t$—$Si(R')_{3-p}$—$(OR")_p$, $(OR")_p$—$Si(R')_{3-p}$—$[(R')_2SiO]$—$(W)_s$—$[(R')_2SiO]_q$]—$Si(R')_{3-p}$—$(OR")_p$; or

R-$[G-Si(R')_2]_t$—$(W)_s$—$[(R')_2SiO]_q$—$[Si(R')_2-G]_t$—$[Si(R')_{3-p}$—$(OR")_p]$, in which:

G and W are each divalent linking groups independently selected from oxy, alkylene, arylene, hetroarylene, cycloalkylene, and hetrocycloalkylene;

R is selected from alkyl, alkylene, fluoroalkyl, aryl, fluoroaryl, cycloalkyl, fluorocycloalkyl, etroalkyl, hetrofluoroalkyl, hetroaryl, hetrofluoroaryl, hetrocycloalkyl, and hetrofluorocycloalkyl;

each R' is independently selected from alkyl, alkylene, fluoroalkyl, aryl, fluoroaryl, cycloalkyl, fluorocycloalkyl, hetroalkyl, hetrofluoroalkyl, hetroaryl, hetrofluoroaryl, hetrocycloalkyl, hetrofluorocycloalkyl, oxyalkyl, oxyalkylene, oxyfluoroalkyl, oxyaryl, oxyfluoroaryl, oxycycloalkyl, oxyfluorocycloalkyl, oxyhetroalkyl, oxyhetrofluoroalkyl, oxyhetroaryl, oxyhetrofluoroaryl, oxyhetrocycloalkyl, and oxyhetrofluorocycloalkyl;

each R" is independently selected from alkyl, preferably methyl or ethyl;

p is an integer selected from 1, 2 or 3;

each q is independently selected as an integer of 0-150, inclusive;

s is selected as an integer of 0-40, inclusive;

each t is independently selected as an integer of 0 or 1.

Surprisingly, inclusion of at least one alkoxysilane compound (d) in the curable composition has been shown, in some exemplary embodiments illustrated below, to result in a curable composition which exhibits extended cure time or "pot life" once activated by addition of the catalyst component (c) to components (a) and (b). Such extended pot life has the unexpected advantage of producing curable compositions suitable for application to substrates in continuous or semi-continuous processes, for example precision coating processes, as described further below.

Preparation of Curable Compositions

In other exemplary embodiments, the present disclosure provides a coating process including:

(a) applying the composition of any preceding claim to at least a portion of a substrate; and (b) curing said composition to form a cross-linked coating on the substrate.

The curable compositions of the present disclosure comprise components (a), (b), and (c). Advantageously, the curable composition consists essentially of these three components (that is, the curable composition advantageously comprises only dehydrogenatively-curable organosiloxane oligomer components).

The curable compositions of the present disclosure can be prepared by combining components (a), (b), and (c) (and optionally component (d)) in essentially any order (advantageously, with agitation or stirring). Advantageously, components (a) and (b) (and optionally, component (c)) are combined initially, followed by addition of component (c) (advantageously, as a pre-formed catalyst composition).

In some exemplary embodiments, the curable composition(s) can be maintained as relatively shelf-stable, 2-part system(s) (for example, by keeping component (c) separate from the other two components), if desired, but a 1-part system (comprising components (a), (b), and (c), and preferably component (d)) can also be stable for periods of up to, for example, about several days prior to coating or other application of the composition, a surprisingly long pot life.

The relative amounts of components (a) and (b) can vary widely, depending upon their nature and the desired properties of the curable and/or cured composition. Although stoichiometry prescribes a 1:1 molar ratio of reactive silane functionality (for example, one mole of hydrosilyl moieties for every mole of hydroxysilyl moieties), in practice it can be useful to have a deficiency or an excess of hydrosilyl functionality (for example, this can be useful when cure inhibitors are present). Molar ratios (of hydrosilyl moieties to hydroxysilyl moieties) up to, for example, about 8:1 or about 13:1 or even as high as about 35:1 can be useful. Component (c) (the catalyst composition) can be present in the curable composition in amounts ranging from about 0.1 to about 10 weight percent (advantageously, from about 0.1 to about 5 weight percent; more advantageously, from about 0.5 to about 2 weight percent), based upon the total weight of components (a), (b), and (c).

The base and the Lewis acid can generally be used in stoichiometric molar amounts (based upon the number of vacant orbitals of the Lewis acid that are available to receive an electron pair from the base). When zinc (II) salt(s) (having at least two such vacant orbitals) are used as the Lewis acid(s), however, a sub-stoichiometric molar ratio of 1:1 (base: Lewis acid) can be advantageous over a stoichiometric ratio of 2:1. For example, somewhat better catalytic performance (in the form of a more controlled, slower reaction and longer bath life at room temperature, as well as better cure upon heating) can be provided by the former ratio at relatively low cure temperatures.

If desired, the catalyst composition can optionally further contain at least one carboxylic acid or anhydride in amounts ranging from about 1 to about 50 weight percent (advantageously, from about 10 to about 40 weight percent; more advantageously, from about 20 to about 30 weight percent), based upon the total weight of the base and the carboxylic acid or anhydride. Alternatively (and advantageously), the optional carboxylic acid or anhydride can be separately added to the curable composition in such amounts.

Advantageously, the curable composition is substantially free of organic solvents, for example aliphatic solvents (e.g., heptane, isoparaffinic hydrocarbons, and the like, and mixtures thereof); aromatic solvents (e.g., toluene, xylene, 1,2-dichlorobenzene, 1,3-dichlorobenzene, 1,4-dichlorobenzene, and the like, and mixtures thereof); ketones (e.g., methyl ethyl ketone (MEK), cyclohexanone, and the like, and mixtures thereof); alkyl esters (e.g., ethyl acetate, butyl acetate, and the like, and mixtures thereof); ethers (for example, t-butyl methyl ether, tetrahydrofuran (THF), and the like, and mixtures thereof); and the like, and mixtures thereof.

Minor amounts of optional components can be added to the curable composition to impart particular desired properties for particular curing methods or uses. Useful compositions can comprise conventional additives such as, for example, catalysts (including conventional condensation catalysts such as tin catalysts, which can be added as co-catalysts if desired), initiators, emulsifiers (including surfactants), stabilizers, anti-oxidants, flame retardants, adhesion promoters (for example, trialkoxysilanes), release modifiers (for example, silicate MQ resin), colorants, thickeners (for example, carboxy methyl cellulose (CMC), polyvinylacrylamide, polypropylene oxide, polyethylene oxide/polypropylene oxide copolymers, polyalkenols), water scavengers, and the like, and mixtures thereof.

If desired, the curable composition can be prepared in the form of an emulsion (for example, by using water as a diluent), although such a form can be less advantageous (for example, due to the potential occurrence of competing side reactions in the presence of water). Useful emulsifiers (also known as emulgents) include surface active substances or surfactants. Silicone emulsions often contain water, silicone oil, stabilizing surfactants, preservatives, and other additives for viscosity stabilization and freeze-thaw stability.

Although the curable compositions of the present disclosure can be prepared at essentially 100% solids as substantially homogeneous liquid mixtures suitable for application with virtually any known coating means, some curable compositions may, in certain exemplary embodiments, advantageously take the form of an aqueous emulsion (e.g., an emulsion with water as the continuous phas) by any of a variety of known or hereafter-developed mechanical or chemical emulsification techniques. Useful emulsification techniques include those described, for example, in European Patent Applications Nos. 0 268 982 (Toray Silicone Company, Ltd.), 0 459 500 (Dow Corning Corporation), and 0 698 633 (Dow Corning Corporation), the descriptions of the techniques being incorporated herein by reference.

A particularly useful technique for producing silicone in water emulsions is that described in U.S. Pat. No. 6,013,682 (Dalle et al.), the technique description being incorporated herein by reference. This technique provides emulsions in which silicones polymerize by chain extension at the interior of silicone droplets suspended in water. U.S. Pat. No. 5,229,212 (Reed) describes another useful technique in which a high molecular weight, water-soluble or water-dispersible polymeric thickening agent (such as polyethylene oxide) is utilized, the description of the technique being incorporated herein by reference.

Suitable emulsifiers for use in the curable composition of the present disclosure include non-ionic (including polymeric non-ionic surfactants (for example, alkylpolysaccharide)), cationic, anionic, and amphoteric surfactants, and the like, and combinations thereof. The surfactants can be used individually or in combination. Although essentially any type of surfactant can be used, non-ionic surfactants can be advantageous.

Useful non-ionic surfactants include those that are rendered hydrophilic by the presence of a polyethylene glycol chain (obtained by the polycondensation of ethylene oxide). Such non-ionic surfactants are termed 'polyethoxylated non-ionics.' Other examples of useful non-ionic surfactants include polyalkenols (also known as polyvinyl alcohols), polyoxyalkylene alkyl ethers, polyoxyalkylene sorbitan alkyl esters, polyoxyalkylene alkyl esters, polyoxyalkylene alkylphenol ethers, polyethylene glycols, polypropylene glycols, diethylene glycols, polyethylene oxide-polypropylene oxide block copolymers, ethoxylated or sulfonated resins, carboxymethyl cellulose and other polysaccharide derivatives, polyacrylates, xanthane, and the like, and combinations thereof. Advantageous non-ionic surfactants include polymeric non-ionic surfactants and combinations thereof (more advantageously, polyalkenols and combinations thereof).

Examples of useful cationic surfactants include quaternary ammonium hydroxides (for example, tetramethylammonium hydroxide, octyltrimethylammonium hydroxide, dodecyltrimethylammonium hydroxide, hexadecyltrimethylammonium hydroxide, octyldimethylbenzylammonium hydroxide, decyldimethylbenzyl ammonium hydroxide, didodecyldimethylbenzyl ammonium hydroxide, dioctadecyldimethylammonium hydroxide, tallow trimethylammonium hydroxide, cocotrimethylammonium hydroxide, and the like, and combinations thereof), corresponding salts of the quaternary ammonium hydroxides, fatty acid amines and amides and their derivatives, salts of the fatty acid amines and amides (including aliphatic fatty amines and amides) and their derivatives, homologs of aromatic amines having fatty chains, fatty amides derived from aliphatic diamines, fatty amides derived from disubstituted amines, derivatives of ethylene diamine, amide derivatives of amino alcohols, amine salts of long-chain fatty acids, quaternary ammonium bases derived from fatty amides of disubstituted diamines, quaternary ammonium bases of benzimidazolines, basic compounds of pyridinium and its derivatives, sulfonium compounds, quaternary ammonium compounds of betaine, urethanes of ethylene diamine, polyethylene diamines, polypropanolpolyethanol amines, and the like, and combinations thereof.

Examples of useful anionic surfactants include alkylbenzene sulfonates (detergents), fatty acids (soaps), alkyl sulfates such as lauryl sulfate (foaming agents), di-alkyl sulfosuccinates (wetting agents), lignosulfonates (dispersants), and the like, and combinations thereof. Other useful anionic surfactants include those described in U.S. Pat. No. 6,013,682 (Dalle et al.), the descriptions thereof being incorporated herein by reference.

Another class of useful surfactants is that of amphoteric or zwitterionic surfactants, which include single surfactant molecules that exhibit both anionic and cationic dissociations. Examples of useful amphoteric surfactants include betaines, sulfobetaines, natural substances such as amino-acids and phospholipids, and the like, and combinations thereof.

The amount of surfactant that can be included in the curable compositions of the present disclosure will vary (for example, depending upon the nature of the surfactant(s)). Amounts of surfactant in the range of about 0.01 to about 35 weight percent (based upon the total weight of the curable composition), however, can often be useful (with amounts in the range of about 0.1 to about 20 weight percent being advantageous, and amounts in the range of about 0.5 to about 5 or 10 weight percent being more advantageous). The total amount of water that can be included in the curable composition to form an aqueous emulsion can also vary but generally can be in the range of about 20 to about 95 weight percent (based upon the total weight of the curable composition).

If desired, the catalyst composition (component (c)) can be pre-emulsified (for example, by addition of the catalyst composition to an aqueous solution of surfactant and/or thickening agent, followed by shaking or agitation of the resulting mixture) prior to its combination with the other components of the curable composition.

Use and Curing of the Curable Composition

In yet another aspect, this disclosure further provides an article including at least one substrate having at least one major surface, the substrate bearing, on at least a portion of the at least one major surface, a cross-linked coating prepared by the foregoing process.

The curable compositions of the present disclosure can be used in various different applications. For example, the composition(s) can be used as sealants, release coatings, surface treatments, hardcoats, and the like. When used as fluorinated surface treatments, a degree of hydrophobicity and/or oleophobicity can be imparted to a variety of substrates (for example, for surface protection or to enhance ease of cleaning).

The curable compositions of the present disclosure (or, alternatively, its components) can be applied to at least a portion of at least one major surface of a substrate (for example, a sheet, a fiber, or a shaped object) by essentially any known or hereafter-developed application method, so as to form a variety of different coated articles. Preferably, the at least a portion of the substrate is at least one major surface of the substrate. In certain exemplary embodiments, the cross-linked coating contacts the at least one major surface of the substrate. In other exemplary embodiments, the cross-linked coating overlays but does not contact the at least one major surface of the substrate.

The curable compositions can be applied in essentially any manner (and with essentially any thickness) that can form a useful coating when cured.

Application Methods

Useful application methods include coating methods such as dip coating, spin coating, spray coating, wiping, roll coating, wire coating, Mayer rod coating, extrusion (e.g., die) coating, curtain coating, slide coating, gravure coating, knife coating, and the like, and combinations thereof. The compositions can be applied in neat, 100% solids (i.e., substantially organic solvent-free) form, or in the form of an aqueous emulsion.

Substrates

Substrates suitable for use in preparing the coated articles include those having at least one surface comprising a material that is solid and advantageously substantially inert to any coating or application solvent that is used. Advantageously, the curable composition can adhere to the substrate surface through chemical interactions, physical interactions, or a combination thereof (more advantageously, a combination thereof).

Suitable substrates can comprise a single material or a combination of different materials and can be homogeneous or heterogeneous in nature. Useful heterogeneous substrates include coated substrates comprising a coating of a material (for example, a metal or a primer) borne on a physical support (for example, a polymeric film).

Useful substrates include those that comprise wood, glass, minerals (for example, both man-made ceramics such as concrete and naturally-occurring stones such as marble and the like), polymers (for example, polycarbonate, polyester, polyacrylate, and the like) including multi-layer polymeric films, metals (for example, copper, silver, gold, aluminum, iron, stainless steel, nickel, zinc, and the like), metal alloys, metal compounds (for example, metal oxides and the like), leather, parchment, paper, textiles, painted surfaces, and combinations thereof. Advantageous substrates include glass, minerals, wood, paper, metals, metal alloys, metal compounds, polymers, and combinations thereof (more advantageously, paper, metals, metal alloys, metal compounds, polymers, and combinations thereof).

Advantageous substrates include those used for pressure-sensitive adhesive (PSA) products. For example, the curable composition can be applied to suitable flexible or inflexible backing materials and then cured. Useful flexible backing materials include paper, Kraft paper, polyolefin-coated paper, plastic films (for example, poly(propylene), poly(ethylene), poly(vinyl chloride), polyester (including poly(ethylene terephthalate), polyamide, cellulose acetate, and ethyl cellulose), and the like, and combinations thereof, although essentially any surface requiring release toward adhesives can be utilized. Backings can thus also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backings can be formed of metal, metallized polymeric film, or ceramic sheet material. Primers (including surface treatments such as corona treatment) can be utilized, but they are not always necessary.

Coated Articles

The curable composition of the present disclosure can provide coatings that are suitable for use as release layers or liners in the manufacture of pressure sensitive adhesive (PSA) coated labels and tapes. The specific level of release provided upon curing can be controllably varied through variation in, for example, the weight percentage and molecular weight of component (a) of the composition, or through the addition of release modifiers (for example, silicate MQ resin), which also can be varied in nature and/or amount.

The advantageous curing conditions will vary, depending upon the particular application and its accompanying requirements and conditions. Moisture can be present but generally is not necessary. Cure generally can be effected at temperatures ranging from room temperature (for example, about 20-23° C.) up to about 150° C. or more (advantageously, temperatures of about 20° C. to about 125° C.; more advantageously, about 40° C. to about 120° C.; most advantageously, about 60° C. to about 110° C.). Curing times can range from a few seconds (for example, at about 110° C.) to hours (for example, under low catalyst or somewhat lower temperature conditions) to days (for example, at room temperature).

Release coatings obtained via curing of the curable composition of the present disclosure generally contain little or no free silicone to adversely affect the tack and peel properties of PSAs that come in contact with them. The curable composition of the present disclosure can cure relatively rapidly to provide relatively firmly anchored, highly cross-linked, solvent-resistant, tack-free coatings, which can be used with a broad range of PSA types (for example, acrylates, tackified natural rubbers, and tackified synthetic elastomers).

Articles in the form of PSA laminates (for example, comprising a layer of PSA borne on a release liner) can be prepared by placing a PSA layer in contact with the release coating through dry lamination, wet solution casting, or even by application of a photopolymerizable composition to the release coating, followed by irradiation to effect photopolymerization (for example, as described in U.S. Pat. No. 4,181,752 (Martens et al.), the description of which is incorporated herein by reference). Such articles can exhibit relatively good storage stability (as evidenced, for example, by the results of room temperature and/or heat accelerated aging tests to evaluate any change in the level of release (peel force) from the release coating and/or in the subsequent level of adhesion to a desired substrate).

The operation of various exemplary embodiments of the present disclosure will be further described with regard to the following non-limiting detailed examples. These examples are offered to further illustrate the various specific and advantageous embodiments and techniques. It should be understood, however, that many variations and modifications may be made while remaining within the scope of the present disclosure.

EXAMPLES

Embodiments and advantages of this disclosure are further illustrated by the following examples, but the particular materials and amounts thereof recited in these examples, as well as other conditions and details, should not be construed to unduly limit this disclosure. These examples are merely illustrative and are not meant to limit the scope of the claims.
Materials Unless otherwise noted, all parts, percentages, ratios, etc., in the examples and in the remainder of the specification are by weight. Unless otherwise noted, all chemicals were obtained from, or are available from, chemical suppliers such as Aldrich Chemical Company, Milwaukee, Wis. Table I provides abbreviations and a source for the materials used in the examples which follow.

the force required to remove a flexible adhesive from the release liner at a specific angle and rate of removal.

The 180° angle peel adhesion strength of a release liner to an adhesive sample was measured in the following manner, which is generally in accordance with the test method described in Pressure Sensitive Tape Council PSTC-101 Method D (Rev 05/07) 'Peel Adhesion of Pressure Sensitive Tape.'

The Example and Comparative Example release liners prepared as described below were coated with an acrylic radiation-sensitive syrup of liquid monomers (a mixture of 90 parts by weight isooctyl acrylate and 10 parts by weight acrylic acid; less than 10 percent polymerized; essentially as described in Examples 1-7 of U.S. Pat. No. 4,181,752 (Martens et al.), the description of which is incorporated herein by reference) with a notched bar coater to form a continuous web of acrylic syrup nominally 50 micrometers thick. The resulting coated web was then polymerized to more than 95 percent conversion by exposing the acrylic syrup to ultraviolet-A (UV-A) radiation in a nitrogen inert environment. The UV source was a 20 W 350BL lamp (available from Osram Sylvania, Danvers, Mass.). Upon curing, the polymerized syrup formed a pressure-sensitive adhesive (PSA) transfer tape on the release liner. The resulting adhesive transfer tape-release liner construction was aged for 7 days or as described below prior to testing (for release liner adhesion and liner-side stainless steel (SS) peel adhesion).

TABLE I

| Material | Description | Source |
| --- | --- | --- |
| DC-7048 | Hydrosilyl-functional organosiloxane crosslinker, trade designation 'SYL-OFF ™ 7048 CROSSLINKER' (weight-average molecular weight: 4,000~5,000 Da) (hydride content: 1.58-1.60 wt %) | Dow Corning Corporation, Midland, MI. |
| DMS-S12 | Silanol end-capped (terminated) Dimethylsiloxane including two hydroxysilyl moieties (weight-average molecular weight: 400~700 Da) | Gelest, Inc., Morrisville, PA |
| DMS-S27 | Silanol end-capped (terminated) Dimethylsiloxane including two hydroxysilyl moieties (weight-average molecular weight: 2,000~3,500 Da) | Gelest, Inc., Morrisville, PA |
| DMS-S42 | Silanol end-capped (terminated) Dimethylsiloxane including two hydroxysilyl moieties (weight-average molecular weight: 900~1,000 Da) | Gelest, Inc., Morrisville, PA |
| SIB-1824.0 | 1,8-Bis(triethoxysilyl)octane | Gelest, Inc., Morrisville, PA |
| SID-4402 | 1,3-Di-n-octyltetraethoxydisiloxane | Gelest Inc., Morrisville, PA |
| FMS-9992 | Silanol terminated polytrifluoropropylmethylsiloxane | Gelest Inc., Morrisville, PA |
| L-16585 | Heptadecafluoro-1,1,2,2-tetrahydroxydecyltriethoxysilane | Alfa-Aesar, Ward Hill, MA. |
| L-16671 | (3,3,3-Trifluoropropyl)trimethoxysilane | Alfa-Aesar, Ward Hill, MA. |
| Zinc Bis(2-ethylhexanoate) | $Zn(OOCCH(CH_2CH_3)CH_2CH_2CH_2CH_3)_2$, 80 weight percent in mineral spirits. | Alfa-Aesar, Ward Hill, MA. |
| DBU | 1,8-Diazabicyclo(5.4.0)undec-7-ene. | TCI America, Portland, OR. |
| MEK | Methyl Ethyl Ketone | EMD Chemicals, Gibbstown, NJ. |
| MIBK | Methyl Isobutyl Ketone | |
| Acetic Acid | Acetic Acid | Alfa-Aesar, Ward Hill, MA. |

Test Methods
Method for Testing Release Liner Adhesion (Release Test)

This test measured the effectiveness of release liners (prepared using the compositions of the Examples and Comparative Examples described below) that had been aged for a period of time at a constant temperature and relative humidity. The aged release value is a quantitative measure of After aging, a sample of the adhesive transfer tape-release liner construction was cut 2.54 cm wide and approximately 20 cm in length using a specimen razor cutter. The sample was applied with its exposed adhesive side down and lengthwise onto the platen surface of a peel adhesion tester (IMASS Slip/Peel Tester, Model 3M90, obtained from Instrumentors, Incorporated, Strongsville, Ohio). The applied sample was rubbed down on the test panel using light thumb pressure. The sample on the platen surface was rolled twice with a 2 kg rubber roller at a rate of 61 cm per minute.

The release liner portion of the sample was carefully lifted away from the adhesive transfer tape portion of the sample on the platen surface, was doubled back at an angle of 180°, and was secured to the clamp of the peel adhesion tester. The 180° angle release liner peel adhesion strength was then measured at a peel rate of 38.1 mm per second. A minimum of three test samples were evaluated with results obtained in grams-force per inch (g/inch), which results were used to calculate the average peel force. This average peel force was then converted to Newtons per decimeter (N/dm). All release tests were carried out in a facility at constant temperature (23° C.) and constant relative humidity (50 percent).

Method for Testing Liner-Side Stainless Steel (SS) Peel Adhesion (Readhesion Test)

Measurements were taken to determine whether a drop in adhesion value occurred due to undesirable contamination of the adhesive surface by the release coating of the release liner. These measurements were also carried out at 23° C. and 50 percent relative humidity. At least two measurements were made for each Example and Comparative Example, and the resulting data are reported as an average of all measurements. Measurements were made in g/inch and converted to N/dm.

The 90° angle peel adhesion strength of a tape sample to stainless steel (SS) was measured using the procedure described below, which is generally in accordance with the test method described in Pressure Sensitive Tape Council PSTC-101 Method C (Rev 05/07) 'Peel Adhesion of Pressure Sensitive Tape.' The test was run at 23° C. (73.4° F.) and 50 percent relative humidity (RH).

A 50 micrometer thick PET film (obtained from Mitsubishi Polyester Film, Greer, S.C. under the trade designation '3 SAB PET') was laminated to the adhesive side of adhesive transfer tape-release liner constructions prepared essentially as described above. A sample of each construction was then cut 1.27 cm wide and approximately 20 cm in length using a specimen razor cutter. The release liner portion of the sample was carefully removed to expose the adhesive that was against the release liner surface. The resulting sample was applied with its exposed adhesive side down and lengthwise onto the surface of a stainless steel (SS) test panel measuring 12.5 cm long by 5 cm wide, the sample extending beyond the length of one end of the panel. The applied sample was rubbed down on the test panel using light thumb pressure. The test panel with the applied sample (adhesive-backed PET film) was rolled twice with a 2 kg rubber roller at a rate of 61 cm per minute.

Each sample was then equilibrated for 15 minutes at 23° C. and 50 percent RH. After equilibration, the sample was placed in a 90° angle test fixture on a peel adhesion tester (IMASS Slip/Peel Tester, Model 3M90, obtained from Instrumentors, Incorporated, Strongsville, Ohio). An extended end of the sample was secured in the clamps of the peel adhesion tester, and peel adhesion was measured at a peel rate of 30.5 cm per minute. A minimum of two test samples were evaluated with results obtained in ounces-force per 0.5 inch, which results were used to calculate the average peel force. This average peel force was then converted to Newtons per decimeter (N/dm).

Silicone Coating Weight Determination

Coating weights were determined by punching samples (about 3.69 cm in diameter) of coated and uncoated substrates and then comparing the weight differences between the resulting coated and uncoated samples using an energy-dispersive X-ray fluorescence (EDXRF) spectrophotometer (obtained from Oxford Instruments, Elk Grove Village, Ill. under the trade designation OXFORD LAB X3000).

Percent Extractable Silicone Determination

The percentage of extractable silicone (that is, unreacted silicone), a measure of the extent of silicone cure on a release liner, was measured by the following method within 15 minutes after coating (of curable silicone compositions, as described in the Examples and Comparative Examples below) and again after 7 days.

Extractables were measured on cured thin film compositions to ascertain the extent of silicone crosslinking. The initial coating weight of a 3.69 cm diameter sample of coated substrate was determined according to the Silicone Coating Weight Determination procedure described above. The coated sample was then dipped and shaken in methyl isobutyl ketone (MIBK) for 5 minutes, was removed, and was allowed to dry. The coating weight of the removed sample was then measured again (to obtain a final coating weight), and the resulting difference between the initial and final coating weights was recorded as the percentage of extractable silicone.

Percent Extractable Silicone was calculated using the following formula:

$$[(a-b)/a] \times 100 = \text{Percent Extractable Silicone}$$

where a=initial coating weight (before extraction with MIBK)

where b=final coating weight (after extraction with MIBK)

Preparation of Catalyst Composition No. 2 (Comprising DBU, Acetic Acid and Zinc Bis(2-ethylhexanoate) (1:1:3))

A Zn-DBU-AA complex was prepared using the materials described in the following Table 2. DBU was mixed with zinc bis(2-ethylhexanoate) and left overnight. Acetic acid was added to the mixture.

TABLE 2

| Component | Amount (g) |
| --- | --- |
| Zinc Bis(2-ethylhexanoate) | 30.0 |
| DBU | 10.0 |
| Acetic Acid | 10.0 |

Two compositions were made that contained a bis(trialkoxy)silane and the above Zn-DBU-AA catalyst complex. Comparative Example A was prepared without addition of a silicone hydride. Example 1 was prepared with addition of a silicone hydride. These compositions are described further in Tables 3 and 4.

Comparative Example A

TABLE 3

| Component | Amount (g) |
| --- | --- |
| Gelest DMS-S12 | 4.50 |
| Gelest SIB-1824 | 0.50 |
| Zn-DBU-AA | 0.51 |

Example 1

TABLE 4

| Component | Amount (g) |
| --- | --- |
| Gelest DMS-S12 | 4.49 |
| Gelest SIB-1824 | 0.49 |
| DC-7048 | 0.50 |
| Zn-DBU-AA | 0.51 |

Comparative Example A and Example 1 were each split into two vials, with one vial of each composition left at room temperature overnight while the other vial of each composition was placed in an oven for 15 minutes at 105 C. The results are summarized in the Table 5 below:

TABLE 5

| Composition | Room Temperature Overnight | 105° C. for 15 minutes |
| --- | --- | --- |
| Comparative Example A | No Cure | No Cure |
| Example 1 | No Cure | Cure |

Example 2

The composition described in Table 6 below was evaluated for cure using a Brookfield DV-II+ Pro viscometer. The composition was placed in a 40 mL vial and its viscosity at room temperature was measured overnight. The following morning, the vial was placed in a water bath that was then heated to 70° C. The composition cured when the temperature of the water bath had reached approximately 70° C.

TABLE 6

| Component | Amount (g) |
| --- | --- |
| DMS-S12 | 22.5 |
| SIB-1824 | 2.5 |
| DC-7048 | 2.5 |
| Zn-DBU-AA | 1.3 |

Example 3

A pre-mix (Pre-mix A) composition containing higher molecular weight silicones was made as described in the following Table 7. A compositions was then made as described in Example 2, with Pre-mix A being substituted for the DMS-S12 in the composition of Example 2.

TABLE 7

(Pre-mix A)

| Component | Amount (g) |
| --- | --- |
| DMS-S12 | 216 |
| DMS-S27 | 76.3 |
| DMS-S42 | 25.4 |

A comparison was made of cure rates at elevated temperatures with and without the higher molecular weight components present (Gelest DMS-27 and Gelest DMS-42). The results demonstrate that there is a significant increase in cure rate at 70° C. when the higher molecular weight hydroxy-terminated silicones are present in the composition.

Example 4

The composition described in Table 8 below was prepared in a 20 ml vial and an observation was made after 3 hours storage at room temperature. The composition was then left at room temperature for overnight. The composition remained fluid for 3 hours, and completely cured in 18 hours.

TABLE 8

| Component | Amount (g) |
| --- | --- |
| Pre-mix A | 4.57 |
| L-16585 | 0.59 |
| DC-7048 | 0.57 |
| DBU-Zn-AA | 0.34 |

Example 5

The composition described in Table 9 below was evaluated for cure using a Brookfield DV-II+ Pro viscometer. The composition was place in a 40 mL vial and its viscosity at room temperature was measured overnight. The following morning, the vial was placed in a water bath that was then heated to 72° C. The composition cured when the temperature of the water bath had reached approximately 72° C.

TABLE 9

| Component | Amount (g) |
| --- | --- |
| Pre-mix A | 19.57 |
| L-16585 | 2.17 |
| DC-7048 | 2.17 |
| DBU-Zn-AA | 1.09 |

Example 6

The composition described in Table 10 below was prepared in a 20 ml vial and an observation was made after 3 hours storage at room temperature. The composition was then left at room temperature overnight. The composition remained fluid for 3 hours, and completely cured in 18 hours.

TABLE 10

| Component | Amount (g) |
| --- | --- |
| Pre-mix A | 4.55 |
| L-16671 | 0.49 |
| DC-7048 | 0.53 |
| DBU-Zn-AA | 0.26 |

Example 7

The composition described in Table 11 below was prepared in a 20 ml vial and an observation was made after 3 hours storage at room temperature. The composition was then left at room temperature overnight. The composition remained fluid for 3 hours, and completely cured in 18 hours. A sample of this composition was also heated at 80° C., and cured within 25 minutes.

TABLE 11

| Component | Amount (g) |
|---|---|
| Pre-mix A | 4.48 |
| SID-4402 | 0.51 |
| DC-7048 | 0.5 |
| DBU-Zn-AA | 0.25 |

Example 8

The composition described in Table 12 below was prepared in a 20 ml vial and an observation was made after 3 hours storage at room temperature. The sample was then left overnight at room temperature. The composition remained fluid for 3 hours, and completely cured in 18 hours.

TABLE 12

| Component | Amount (g) |
|---|---|
| Pre-mix A | 3.99 |
| FMS-9922 | 0.62 |
| SIB-1824 | 0.54 |
| DC-7048 | 0.51 |
| DBU-Zn-AA | 0.29 |

Example 9

The composition described in Table 13 below was evaluated for cure using a Brookfield DV-II+ Pro viscometer. The composition was placed in a 40 mL vial and its viscosity at room temperature was measured overnight. The following morning, the vial was placed in a water bath that was then heated to 70° C. The composition cured when the temperature of the water bath had reached approximately 70° C.

TABLE 13

| Component | Amount (g) |
|---|---|
| Pre-mix A | 19.57 |
| FMS-9922 | 1.09 |
| SIB-1824 | 1.09 |
| DC-7048 | 2.17 |
| DBU-Zn-AA | 1.09 |

Extractables from Cured Coatings

A 2-roll Euclid coater was used to prepare hand spreads of the composition given in Example 2 on a polyethylene coated Kraft (PCK) paper substrate. The composition was coated approximately 15 minutes after adding the catalyst, and then again the next morning, approximately 20 hours later. Although there was an increase in coat weight on both the gloss and matte side of the substrate when the more viscous aged composition was coated, the percent extractables remained the same or decreased slightly. The amount of extractables was less than 4% in all cases.

Peel Force and Readhesion Tests

The coated samples (matte side) were laminated with 3M 845 book tape (available from 3M Company, St. Paul, Minn.) and aged for 22 hours at room temperature and 70° C. Peel force was measured by peeling away 845 book tape at 180 degrees and 90'/min (228.6 cm/min). Readhesion was measured by laminating the peeled tape to a clean glass plate and then peeling it away at 90'/min (228.6 cm/min). Peel force was between 10-12 On (about 3.94-4.72 g/cm) for the unaged sample, versus 9-10 On (about 3.54-3.94 g/cm) for the 70° C. aged sample. Readhesion was between 16-17 oz/in (about 179-190 g/cm) for the unaged sample, versus 17-18 oz/in (190-201 g/cm) for the 70° C. aged sample.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term 'about.'

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

We claim:

1. A composition comprising the following components:
   (a) at least one organosiloxane compound, fluorinated organosiloxane compound, or a combination thereof, comprising reactive silane functionality comprising at least two hydroxysilyl moieties;
   (b) at least one organosiloxane oligomer, fluorinated organosiloxane oligomer, or a combination thereof, comprising reactive silane functionality comprising at least two hydrosilyl moieties; and
   (c) a catalyst composition comprising (1) at least one base selected from amidines, guanidines, phosphazenes, proazaphosphatranes, and combinations thereof, and (2) at least one Lewis acid;
   wherein at least one of said components (a) and (b) has an average reactive silane functionality of at least three, the composition is substantially free of an organic solvent, and the composition further comprises

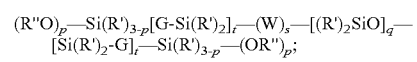

wherein:
   G and W are oxy;
   each R' is independently selected from alkyl, alkylene, fluoroalkyl, aryl, fluoroaryl, cycloalkyl, fluorocycloalkyl, hetroalkyl, hetrofluoroalkyl, hetroaryl, hetrofluoroaryl, hetrocycloalkyl, hetrofluorocycloalkyl, oxyalkyl, oxyfluoroalkyl, oxyaryl, oxyfluoroaryl, oxycycloalkyl, oxyfluorocycloalkyl, oxyhetroalkyl, oxyhetrofluoroalkyl, oxyhetroaryl, oxyhetrofluoroaryl, oxyhetrocycloalkyl, and oxyhetrofluorocycloalkyl;

each R" is independently selected from alkyl;

P is an integer selected from 1, 2 or 3;

each q is independently selected as an integer of 0-150, inclusive;

s is selected as an integer of 0-40, inclusive; and each t is independently selected as an integer of 0 or 1.

2. The composition of claim 1, wherein said components (a) and (b) each comprise an organosiloxane oligomer having a weight average molecular weight no greater than 5,000 Da, optionally wherein each organosiloxane oligomer is a dimethylsiloxane oligomer.

3. The composition of claim 1, wherein said component (a) is hydroxyl-endblocked.

4. The composition of claim 1, wherein said component (a) is represented by:

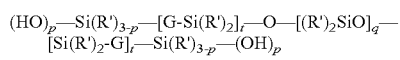
$(HO)_p-Si(R')_{3-p}-[G-Si(R')_2]_t-O-[(R')_2SiO]_q-[Si(R')_2-G]_t-Si(R')_{3-p}-(OH)_p$ wherein each G is independently a divalent linking group;

each R' is independently selected from alkyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl;

each p is independently an integer of 1, 2, or 3;

q is an integer of 0 to 150; and each t is independently an integer of 0 or 1.

5. The composition of claim 1, wherein said component (a) comprises a mixture of (1) at least one polyorganosiloxane, fluorinated polyorganosiloxane, or combination thereof having a weight average molecular weight in the range of 10,000 to 1,000,000 and (2) at least one organosiloxane oligomer, fluorinated organosiloxane oligomer, or combination thereof having a weight average molecular weight in the range of about 150 to about 5,000 Da.

6. The composition of claim 1, wherein said component (b) is represented by the following general formula:

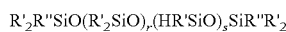
$R'_2R"SiO(R'_2SiO)_r(HR'SiO)_sSiR"R'_2$ wherein each R' is independently selected from H, alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl;

each R" is independently H or R';

r is an integer of 0 to 150, inclusive; and s is an integer of 2 to 150, inclusive.

7. The composition of claim 1, wherein the base of component (c) is selected from:

(1) amidine compounds that are represented by the following general formula:

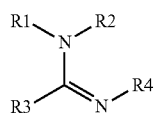

(2) guanidine compounds that are represented by the following general formula:

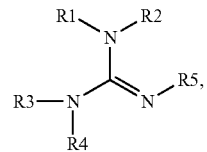

(3) phosphazene compounds that are represented by the following general formula:

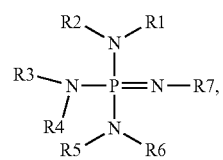

(4) proazaphosphatrane compounds that are represented by the following general formula:

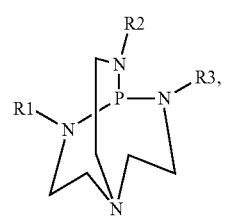

and combinations thereof;]
wherein R1, R2, R3, R4, R5, R6, and R7 are each independently selected from hydrogen, monovalent organic groups, monovalent heteroorganic groups, and combinations thereof.

8. The composition of claim 7, wherein the base is selected to include at least two amidine compounds, guanidine compounds, phosphazene compounds, or combinations thereof, and further wherein any two or more of R1, R2, R3, R4, R5, R6, and R7 of said at least two amidine, guanidine, and phosphazene compounds are bonded together to form at least one ring structure.

9. The composition of claim 1, wherein said Lewis acid is selected from metal salts, trialkylborates, triarylborates, and combinations thereof.

10. The composition of claim 1, further comprising at least one carboxylic acid, at least one carboxylic acid anhydride, or a combination thereof.

11. The composition of claim 1, wherein said composition is substantially free of a tin catalyst.

12. The composition of claim 1 wherein the catalyst composition (1) comprises at least one base selected from 1,2-dimethyl-1,4,5,6-tetrahydropyrimidine, 1,8-diazabicyclo[5.4.0]-7-undecene (DBU), 1,5-diazabicyclo[4.3.0]-5-nonene (DBN), 1,5,7-triazabicyclo[4.4.0]dec-5-ene (TBD), 7-methyl-1,5,7-triazabicyclo[4.4.0]dec-5-ene (MTBD), 2-tert-butyl-1,1,3,3-tetramethylguanidine, and combinations thereof.

13. The composition of claim 1, wherein at least one of said component (a) or said component (b) is a fluorinated organosiloxane oligomer.

14. The composition of claim 1, wherein said Lewis acid is a zinc(II) salt that is used in a 1:1 molar ratio with said base.

15. A process comprising
   (a) applying the composition according to claim 1 to at least a portion of a substrate; and
   (b) at least partially curing said composition to form a cross-linked coating on the substrate.

16. An article comprising the cross-linked coating prepared by the process of claim 15, wherein the at least a portion of the substrate is at least one major surface of the substrate, optionally wherein the cross-linked coating contacts the at least one major surface of the substrate.

17. The article of claim 16, wherein said article further comprises a layer of a pressure-sensitive adhesive prepared by application of a photopolymerizable composition to said cross-linked coating, followed by irradiation of said photopolymerizable composition to effect photopolymerization thereof.

* * * * *

UNITED STATES PATENT AND TRADEMARK OFFICE
CERTIFICATE OF CORRECTION

PATENT NO. : 10,370,499 B2
APPLICATION NO. : 15/108827
DATED : August 6, 2019
INVENTOR(S) : Kanta Kumar et al.

It is certified that error appears in the above-identified patent and that said Letters Patent is hereby corrected as shown below:

In the Specification

Column 6,
Line 59, after "structure" insert -- . --.

Column 8,
Line 22, delete "(OR")$_p$," and insert -- (OR")$_p$; --, therefor.
Line 23, delete "[(R')$_2$SiO]—" and insert -- [(R')$_2$SiO]$_q$— --, therefor.
Line 29, delete "hetroarylene," and insert -- heteroarylene, --, therefor.
Line 30, delete "hetrocycloalkylene;" and insert -- heterocycloalkylene; --, therefor.
Lines 32 & 33, delete "hetroalkyl, hetrofluoroalkyl, hetroaryl, hetrofluoroaryl, hetrocycloalkyl, and hetrofluorocycloalkyl;" and insert -- heteroalkyl, heterofluoroalkyl, heteroaryl, heterofluoroaryl, heterocycloalkyl, and heterofluorocycloalkyl; --, therefor.
Lines 36 & 37, delete "hetroalkyl, hetrofluoroalkyl, hetroaryl, hetrofluoroaryl, hetrocycloalkyl, hetrofluorocycloalkyl," and insert -- heteroalkyl, heterofluoroalkyl, heteroaryl, heterofluoroaryl, heterocycloalkyl, heterofluorocycloalkyl, --, therefor.
Lines 39-41, delete "oxyhetroalkyl, oxyhetrofluoroalkyl, oxyhetroaryl, oxyhetrofluoroaryl, oxyhetrocycloalkyl, and oxyhetrofluorocycloalkyl;" and insert -- oxyheteroalkyl, oxyheterofluoroalkyl, oxyheteroaryl, oxyheterofluoroaryl, oxyheterocycloalkyl, and oxyheterofluorocycloalkyl; --, therefor.

Column 15,
Line 49, delete "L58" and insert -- 1.58 --, therefor.

Column 16,
Line 19, delete "acid;" and insert -- acid. --, therefor.

Column 25,
Line 23, delete "(OR")$_p$," and insert -- (OR")$_p$; --, therefor.
Line 24, delete "[(R')$_2$SiO]—" and insert -- [(R')$_2$SiO]$_q$— --, therefor.

Signed and Sealed this
Nineteenth Day of May, 2020

Andrei Iancu
*Director of the United States Patent and Trademark Office*

CERTIFICATE OF CORRECTION (continued)
U.S. Pat. No. 10,370,499 B2

Line 30, delete "hetroarylene," and insert -- heteroarylene, --, therefor.
Line 31, delete "hetrocycloalkylene;" and insert -- heterocycloalkylene; --, therefor.
Lines 33-35, delete "hetroalkyl, hetrofluoroalkyl, hetroaryl, hetrofluoroaryl, hetrocycloalkyl, and hetrofluorocycloalkyl;" and insert -- heteroalkyl, heterofluoroalkyl, heteroaryl, heterofluoroaryl, heterocycloalkyl, and heterofluorocycloalkyl; --, therefor.
Lines 38 & 39, delete "hetroalkyl, hetrofluoroalkyl, hetroaryl, hetrofluoroaryl, hetrocycloalkyl, hetrofluorocycloalkyl," and insert -- heteroalkyl, heterofluoroalkyl, heteroaryl, heterofluoroaryl, heterocycloalkyl, heterofluorocycloalkyl, --, therefor.

Column 25,
Lines 41-43, delete "oxyhetroalkyl, oxyhetrofluoroalkyl, oxyhetroaryl, oxyhetrofluoroaryl, oxyhetrocycloalkyl, and oxyhetrofluorocycloalkyl;" and insert -- oxyheteroalkyl, oxyheterofluoroalkyl, oxyheteroaryl, oxyheterofluoroaryl, oxyheterocycloalkyl, and oxyheterofluorocycloalkyl; --, therefor.

Column 27,
Line 34, delete "phas)" and insert -- phase) --, therefor.

Column 37,
Line 66, delete "On" and insert -- g/in --, therefor.
Line 67, delete "On" and insert -- g/in --, therefor.

In the Claims

Column 38,
Line 58, in Claim 1, delete "—Si(R′)$_{3-p}$[G" and insert -- —Si(R′)$_{3-p}$—[G --, therefor.
Lines 64 & 65, in Claim 1, delete "hetroalkyl, hetrofluoroalkyl, hetroaryl, hetrofluoroaryl, hetrocycloalkyl, hetrofluorocycloalkyl," and insert -- heteroalkyl, heterofluoroalkyl, heteroaryl, heterofluoroaryl, heterocycloalkyl, heterofluorocycloalkyl, --, therefor.
Line 67, in Claim 1, delete "oxyhetroalkyl," and insert -- oxyheteroalkyl, --, therefor.

Column 39,
Lines 1 & 2, in Claim 1, delete "oxyhetrofluoroalkyl, oxyhetroaryl, oxyhetrofluoroaryl, oxyhetrocycloalkyl, and oxyhetrofluorocycloalkyl;" and insert -- oxyheterofluoroalkyl, oxyheteroaryl, oxyheterofluoroaryl, oxyheterocycloalkyl, and oxyheterofluorocycloalkyl; --, therefor.
Line 4, in Claim 1, delete "P" and insert -- p --, therefor.

Column 40,
Line 36, in Claim 7, delete "thereof:]" and insert -- thereof; --, therefor.